United States Patent
Wintzer et al.

(10) Patent No.: US 9,719,645 B2
(45) Date of Patent: *Aug. 1, 2017

(54) MOTOR VEHICLE HEADLIGHT HAVING A COMPLEX HEADLIGHT LENS

(71) Applicant: DOCTER OPTICS SE, Neustadt an der Orla (DE)

(72) Inventors: Wolfram Wintzer, Jena (DE); Dmitry Fedosik, Lippstadt (DE)

(73) Assignee: Docter Optics SE, Neustad an der Orla (DE)

( * ) Notice: Subject to any disclaimer, the term of this patent is extended or adjusted under 35 U.S.C. 154(b) by 427 days.

This patent is subject to a terminal disclaimer.

(21) Appl. No.: 14/397,900

(22) PCT Filed: Apr. 22, 2013

(86) PCT No.: PCT/EP2013/001185
§ 371 (c)(1),
(2) Date: Oct. 30, 2014

(87) PCT Pub. No.: WO2013/178311
PCT Pub. Date: Dec. 5, 2013

(65) Prior Publication Data
US 2015/0124472 A1 May 7, 2015

(30) Foreign Application Priority Data

May 26, 2012 (DE) .................. 10 2012 010 357
Jan. 23, 2013 (DE) .................. 10 2013 001 071

(51) Int. Cl.
*F21S 8/10* (2006.01)
*B60Q 1/00* (2006.01)
(Continued)

(52) U.S. Cl.
CPC ........ *F21S 48/1225* (2013.01); *B60Q 1/0035* (2013.01); *B60Q 1/0041* (2013.01);
(Continued)

(58) Field of Classification Search
CPC .. B60Q 1/0011; B60Q 1/0041; F21S 48/1154; F21S 48/1241; F21S 48/1266;
(Continued)

(56) References Cited

U.S. PATENT DOCUMENTS 5,257,168 A   10/1993  Davenport et al.
5,697,690 A * 12/1997  Okuchi ............... B60Q 1/0011
                                                   362/459

(Continued)

FOREIGN PATENT DOCUMENTS

DE    1165514 B    9/1964
DE    4121673 A1   1/1993
(Continued)

OTHER PUBLICATIONS

International Search Report and Written Opinion, Application No. PCT/EP2013/001185, dated Jul. 29, 2013.

(Continued)

*Primary Examiner* — Hargobind S Sawhney
(74) *Attorney, Agent, or Firm* — Barnes & Thornburg LLP

(57) ABSTRACT

The invention relates to a motor vehicle headlight having at least one first light source and a headlight lens which comprising, for example, a blank-molded integrally formed body which is made from a transparent material, and which comprises at least one light tunnel and a light-conducting part having at least one optically effective light exit surface, wherein the light tunnel comprises, an optically effective, light entry surface and merges, while forming a kink, into the light-conducting part for imaging the kink as a light-dark (Continued)

boundary by means of light coupled in or radiated into the light entry surface from the first light source, wherein the light tunnel has a transition region in which the surface delimiting the light tunnel at the top rises in the direction of the light-conducting part.

26 Claims, 18 Drawing Sheets

(51) Int. Cl.
    *G02B 19/00*     (2006.01)
    *G02B 6/02*     (2006.01)
    *F21V 8/00*     (2006.01)

(52) U.S. Cl.
    CPC .......... *B60Q 1/0047* (2013.01); *F21S 48/115* (2013.01); *F21S 48/1159* (2013.01); *F21S 48/1241* (2013.01); *F21S 48/1275* (2013.01); *F21S 48/1291* (2013.01); *G02B 6/0045* (2013.01); *G02B 6/02342* (2013.01); *G02B 19/0061* (2013.01); *G02B 6/0018* (2013.01)

(58) Field of Classification Search
    CPC .... F21S 48/1329; F21S 48/145; F21S 48/215; F21S 48/1291; F21S 48/236; F21S 8/10; F21S 48/1275; F21S 48/234; G02B 6/0073; G02B 6/005; G02B 6/0045; G02B 6/0071; F21V 7/0091; F21V 13/04; F21Y 2101/00; F21Y 2115/10

See application file for complete search history.

(56) References Cited

U.S. PATENT DOCUMENTS

| | | | |
|---|---|---|---|
| 6,709,141 B1 | 3/2004 | Sisti | |
| 7,073,931 B2 | 7/2006 | Ishida | |
| 7,220,043 B2* | 5/2007 | Cha ................ | G02B 6/0013 |
| | | | 362/263 |
| 8,342,726 B2 | 1/2013 | Fischer et al. | |
| 2004/0156209 A1 | 8/2004 | Ishida | |
| 2006/0087860 A1 | 4/2006 | Ishida | |
| 2007/0147055 A1 | 6/2007 | Komatsu | |
| 2007/0201241 A1 | 8/2007 | Komatsu | |
| 2010/0033849 A1 | 2/2010 | Seki et al. | |
| 2011/0148280 A1 | 6/2011 | Kishimoto et al. | |

FOREIGN PATENT DOCUMENTS

| | | |
|---|---|---|
| DE | 4209957 A1 | 9/1993 |
| DE | 4320554 A1 | 12/1993 |
| DE | 19526512 A1 | 1/1996 |
| DE | 19742159 A1 | 1/1998 |
| DE | 10252228 | 8/2003 |
| DE | 10302969 A1 | 8/2004 |
| DE | 10315131 A1 | 10/2004 |
| DE | 20320546 U1 | 4/2005 |
| DE | 202004005936 U1 | 4/2005 |
| DE | 102005009556 A1 | 9/2005 |
| DE | 102004043706 A1 | 4/2006 |
| DE | 102004048500 A1 | 4/2006 |
| DE | 102005011760 A1 | 9/2006 |
| DE | 102006044641 A1 | 3/2008 |
| DE | 102008026626 A1 | 12/2009 |
| DE | 10252228 B4 | 1/2010 |
| DE | 102008049168 A1 | 4/2010 |
| DE | 102009008631 A1 | 8/2010 |
| EP | 1113216 A2 | 7/2001 |
| EP | 1357334 A1 | 10/2003 |
| EP | 13573333 A2 | 10/2003 |
| EP | 1666787 A1 | 6/2006 |
| EP | 1767398 A1 | 3/2007 |
| EP | 1514148 B1 | 1/2008 |
| EP | 1903275 A1 | 3/2008 |
| EP | 2113222 A1 | 11/2009 |
| EP | 2159479 A2 | 3/2010 |
| EP | 2221219 A1 | 8/2010 |
| EP | 2390561 A1 | 11/2011 |
| FR | 2804494 | 8/2001 |
| FR | 2860280 A1 | 9/2004 |
| GB | 2365962 A | 2/2002 |
| GB | 2399622 B | 8/2005 |
| GB | 2412159 A | 9/2005 |
| JP | 2005317226 | 11/2005 |
| WO | 2004007241 A2 | 1/2004 |
| WO | 2009109209 A1 | 9/2009 |
| WO | 2009147070 A1 | 12/2009 |
| WO | 2012005686 A1 | 1/2012 |
| WO | 2012072193 A2 | 6/2012 |

OTHER PUBLICATIONS

PCT International Search Report and Written Opinion completed by the ISA/EP on Aug. 3, 2012 and issued in connection with PCT/EP2012/002077.
International Preliminary Report on Patentability (Chapter I) issued on Jun. 4, 2013 in connection with PCT/EP2011/005698.
International Preliminary Report on Patentability (Chapter I) issued on Jun. 4, 2013 in connection with PCT/EP2011/005699.
International Preliminary Report on Patentability (Chapter I) issued on Jun. 4, 2013 in connection with PCT/EP2011/005700.
International Preliminary Report on Patentability (Chapter I) issued on Jun. 4, 2013 in connection with PCT/EP2011/005701.
International Preliminary Report on Patentability (Chapter I) issued on Jun. 4, 2013 in connection with PCT/EP2011/005702.
International Preliminary Report on Patentability (Chapter I) issued on Jun. 4, 2013 in connection with PCT/EP2011/005703.
PCT International Search Report completed by the ISA/EP Mar. 19, 2012 and issued in connection with PCT/EP2011/005699.
PCT International Search Report completed by the ISA/EP Feb. 15, 2012 and issued in connection with PCT/EP2011/005700.
PCT International Search Report completed by the ISA/EP Feb. 1, 2012 and issued in connection with PCT/EP2011/005701.
PCT International Search Report completed by the ISA/EP May 9, 2012 and issued in connection with PCT/EP2011/005702.
PCT International Search Report completed by the ISA/EP May 4, 2012 and issued in connection with PCT/EP2011/005703.
PCT International Search Report completed by the ISA/EP Feb. 1, 2012 and issued in connection with PCT/EP2011/005698.
Takahashi, et al. "Laser Headlight" for Next Generation Automotive Lighting. ISAL-2011 Proceedings pp. 271-283.
Office Action issued on May 26, 2012 in German Application No. 102012010357.3.
International Preliminary Report on Patentability established in connection with PCT/EP2013/001185 and issued on Dec. 2, 2014.

\* cited by examiner

MOTOR VEHICLE HEADLIGHT HAVING A COMPLEX HEADLIGHT LENS

CROSS REFERENCE TO RELATED APPLICATIONS

This application is a U.S. nationalization under 35 U.S.C. §371 of International Application No. PCT/EP2013/001185, filed Apr. 22, 2013, which claims priority to German Application No. 102012010357.3, filed May 26, 2012, and German Application No. 102013001071.3, filed Jan. 23, 2013.

FIELD OF THE INVENTION

The invention relates to a vehicle headlight including a headlight lens, which has a body from transparent material including at least one light entry face and at least one optically operative (or effective) light exit face. The invention also relates to a headlight lens, which has a body from transparent material including at least one light entry face and at least one optically operative (or effective) light exit face.

BACKGROUND INFORMATION

DE 203 20 546 U1 discloses a lens blank-molded on both sides and having a curved surface, a planar surface and a retention edge molded onto the lens edge, wherein a supporting edge of a thickness of at least 0.2 mm and projecting with respect to the planar surface is molded onto the retention edge. Herein, the supporting edge is molded onto the outer circumference of the headlight lens. A further headlight lens having a supporting edge is disclosed e.g. by DE 10 2004 048 500 A1.

DE 20 2004 005 936 U1 discloses a lens for illuminating purposes, in particular a lens for a headlight for imaging light emitted from a light source and reflected by a reflector for generating a predetermined illumination pattern, said lens having two opposing surfaces, wherein areas of different optical dispersion effects are provided on at least one first surface.

DE 103 15 131 A1 discloses a headlight for vehicles having at least one two-dimensional luminous field including a plurality of illuminating element (diode) chips and an optical element disposed in the light path of the light beam emitted by the luminous field, wherein the illuminating element chips of the luminous field are disposed in a common recess, and that the recess, on a side facing the direction of light emission, has an outer edge which, in relation to the illuminating element chips, is spatially arranged such that a predetermined gradient of light density is formed in a light dispersion of the headlight in the area of the outer edges.

DE 10 2004 043 706 A1 discloses an optical system for a motor vehicle headlight (headlamp) for dispersing a beam of light rays from an illuminant, with an optical primary element being provided, which has an optical face including a break or discontinuity extending along a line, wherein the optical face is formed smooth at least on one side adjacent the discontinuity so that the beam of light rays is separated into two partial beams of light rays. Herein, it is provided for that at least one of the partial beams of light rays has a sharp edge of limitation. Moreover, the optical system comprises an optical secondary element for imaging the sharp edge of limitation (restriction) on to a predetermined light-dark-boundary.

DE 195 26 512 B4 discloses an illumination device for vehicles, in which light exiting from an optical cable is emitted in a forward direction through a lens body, wherein the illumination device comprises a light conductor of light-transmissive material, which conductor is disposed between a light exit end of the optical cable and a light entry end of the lens body, wherein the light conductor has a light entry face which is configured such that it completely covers the exit light end of the optical cable. The lens body comprises a light entry end which is manufactured separately of the light conductor which is configured such that it contacts the light exit face of the light conductor and covers the light exit face of the light conductor sufficiently and emits a light flux from the light exit face in a forward direction as a light flux having a desired light distribution which is based on a configuration of its light exit face. Herein, the light exit face of the light conductor comprises a central part, which extends through a focal point of the lens body and is configured perpendicularly with respect to an optical axis of the lens body.

DE 102 52 228 A1 discloses a headlight including at least one light source as well as at least one a light termination body associated with the light source and having a light entry face for making light emitted from the light source enter, and a light exit face as well as at least one lens which cooperates with the light exit face and is arranged in the light emitting direction following the light termination body and images the light made to exit from the light termination body, wherein the light termination body has a cross section corresponding to the light distribution to be achieved, wherein the cross section of the light termination body increases from the light entry face in the direction of the light exit face.

Further illumination means in context with vehicles are disclosed by DE 42 09 957 A1, DE 41 21 673 A1, EP 1 357 333 A2, DE 43 20 554 A1, DE 195 26 512 A1, DE 10 2009 008 631 A1, U.S. Pat. No. 5,257,168 and U.S. Pat. No. 5,697,690.

It is, in particular, an object of the invention to suggest an improved headlight lens for a vehicle headlight, for example for a motor vehicle headlight. It is a further object of the invention to reduce the costs for manufacturing vehicle headlights. It is a further object of the invention to reduce the costs for manufacturing motor vehicles. It is a still further object of the invention to suggest a vehicle having particularly compact low-beam headlights.

SUMMARY

The aforementioned object is achieved by a headlight lens for a vehicle headlight, for example for a motor vehicle headlight, wherein the headlight lens comprises a for example blank-molded, for example monolithic, body of transparent material, wherein the body comprises at least one light tunnel and at least one light passage section including at least one optically operative light exit face, wherein the light tunnel comprises at least one for example optically operative light entry face and, via a bend, forms transition into the light passage section for imaging the bend as a bright-dark-boundary by means of light made to enter or irradiated, respectively, into the light entry face, and wherein the light exit face comprises at least two, for example at least three segments (which are separated from each other for example by means of an indentation or of a bend or of a point of discontinuity).

A segment is, for example, an area or zone according to a (mathematical or geometrical, respectively) function, which differs from the (mathematical or geometrical, respectively) function of a neighbouring segment. A segment is, for example, an optically operative area or zone according to a (mathematical or geometrical, respectively) function, which differs from the (mathematical or geometrical, respectively) function of a neighbouring segment.

A segment of the light exit face is, for example, an optically operative area or zone according to a (mathematical or geometrical, respectively) function, which differs from the (mathematical or geometrical, respectively) function of a neighbouring segment of the light exit face.

An optically operative (or effective) light entry (sur-)face and/or an optically operative light exit (sur-)face, respectively, is an optically operative surface of the, e.g. monolithic, body. An optically operative (sur-)face is, in particular, a surface of the transparent body, at which surface, when using the headlight lens according to its purpose, light will be refracted. An optically operative surface is, in particular, a surface at which, when using the headlight lens according to its purpose, the direction of light which passes through this surface will be changed.

Transparent material is in particular glass. Transparent material is for example inorganic glass. Transparent material is for example silicate glass. Transparent material is for example glass as described in PCT/EP2008/010136. Glass for example comprises
  0.2 to 2% by weight $Al_2O_3$,
  0.1 to 1% by weight $Li_2O$,
  0.3, in particular 0.4 to 1.5% by weight $Sb_2O_3$,
  60 to 75% by weight $SiO_2$,
  3 to 12% by weight $Na_2O$,
  3 to 12% by weight $K_2O$, and
  3 to 12% by weight $CaO$.

Herein, the term blank-molding is, in particular, to be understood in a manner that an optically operative surface is to be (injection) molded under pressure such that any subsequent finishing or post-treatment of the contour of this optically operative face may be dispensed with or does not apply or will not have to be provided for, respectively. Consequently, it is particularly provided for that, after blank-molding, the blank-molded surface is not ground, (i.e. it will not [have to] be treated by grinding).

A light tunnel is, in particular, characterized in that essentially total reflection takes place by/at its lateral (for example top, bottom, right and/or left) surfaces, so that light entering the light entry face is conducted through the tunnel as a light guide (conductor). A light tunnel is in particular a light guide or light conductor. In particular, it is provided for that total reflection occurs at the longitudinal surfaces of the light tunnel. In particular, it is provided for that the longitudinal surfaces of the light tunnel are intended for total reflection. In particular, it is provided for that total reflection is achieved on the surfaces of the light tunnel essentially oriented in the direction of the optical axis of the light tunnel. In particular, it is provided for that the surfaces of the light tunnel essentially oriented in the direction of the optical axis of the light tunnel are destined for total reflection. A light tunnel e.g. tapers in the direction of its light entry face. A light tunnel e.g. tapers in the direction of its light entry face by at least 3°. A light tunnel tapers e.g. in the direction of its light entry face by at least 3° with respect to its optical axis. A light tunnel tapers e.g. at least partially in the direction towards its light entry face. A light tunnel favourably tapers at least partially in the direction of its light entry face by at least 3°. A light tunnel tapers e.g. at least partially in the direction of its light entry face by at least 3° with respect to its optical axis.

A bend is, in particular, a curved transition. A bend is, for example, a curved transition having a radius of curvature of no less than 50 nm. For example, it is provided for that the surface of the headlight lens has no break or discontinuity in the bend, but rather a curve or curvature. For example, it is provided for that the surface of the headlight lens in the bend has a curvature, for example, with a radius of curvature of the curve in the bend of no less than 50 nm. In an embodiment the radius of curvature is no larger than 5 mm (for example for implementing fog light). In an expedient embodiment the radius of curvature is no more than 0.25 mm (e.g. for implementing dipped-beam headlight), for example, no more than 0.15 mm, e.g. no more than 0.1 mm. In a further embodiment, the radius of curvature of the curve in the bend is at least 0.05 mm. For example, it is provided for that the surface of the headlight lens is blank-molded in the region of the bend.

According to an embodiment the light tunnel has a transitional area in which the surface (of the light tunnel) restricting the light tunnel in an upward direction rises in the direction towards the light passage section, and/or wherein the surface (of the light tunnel) restricting the light tunnel in an upward direction (for example, when regarded or seen in or with respect to the longitudinal direction, respectively, and/or when regarded or seen in or with respect to the orientation/direction of the optical axis of the light tunnel and/or of the optical axis of the light passage section and/or the optical axis of the light exit face, respectively) has an inflection point, and/or wherein the surface (of the light tunnel) restricting the light tunnel in an upward direction includes (for example, when regarded or seen in or with respect to the longitudinal direction, respectively, and/or when regarded or seen in or with respect to the orientation/direction of the optical axis of the light tunnel and/or of the optical axis of the light passage section and/or the optical axis of the light exit face, respectively) a concavely curved area, e.g. having a radius of curvature of at least 10 mm, e.g. having a radius of curvature of at least 20 mm. In a further embodiment, the surface (of the light tunnel) restricting the light tunnel in a downward direction extends (in particular essentially) horizontally in the transitional area. In a further embodiment, the surface (of the light tunnel) restricting the light tunnel in a downward direction extends (in particular essentially) in parallel to the optical axis of the headlight lens in the transitional area. In a further embodiment, the transitional area is provided for/configured in that half of the light tunnel, which is facing the light passage section. In a further embodiment, the transitional area is provided for/configured only in that half of the light tunnel, which is facing the light passage section. In a further embodiment, the surface (of the light tunnel) restricting the light tunnel upwardly includes a/the point of inflection in the transitional area. In a further embodiment, the surface (of the light tunnel) limiting the light tunnel in the upward direction forms transition into the light passage section with a continuous first derivative. In a further embodiment, the surface (of the light tunnel) limiting the light tunnel in the upward direction forms a continuous transition into the surface (of the light passage section) limiting the light passage section upwardly. In a further embodiment, the surface (of the light tunnel) limiting the light tunnel in the upward direction forms transition into the surface (of the light passage section) limiting the light passage section in an upward direction, with a continuous first derivative. In a further embodiment, the surface (of the light tunnel) limiting the light tunnel in the upward direction includes a concavely curved area in the area of transition. In a further embodiment, the surface (of the light tunnel) limiting the light tunnel in the upward direction includes a concavely curved area in the area of transition having a radius of curvature of at least 20 mm. In a further embodiment, the surface (of the light tunnel) limiting the light tunnel in an upward direction extends continuously. In a further embodiment, the surface (of the light tunnel) limiting the light tunnel in an upward direction extends with a continuous first derivative. In a further embodiment, the light passage section tapers (in a portion facing the light tunnel) in the direction of the light tunnel.

In a further embodiment, the light exit face comprises at least three segments, which, in particular, are separated from one another by means of an indentation/notch or by a bend.

In a further embodiment, the (first) light source and the (first) light entry face are configured and disposed with respect to each other such that light from the (first) light source enters the (first) light entry face with a light flux density of at least 75 lm/mm²

In a further embodiment, the light tunnel is disposed between the bend and the light entry face. In a further embodiment, the light passage section is arranged between the bend and the light entry face. For example, it is provided for that light entering the transparent body through the light entry face and entering the passage section in the region of the bend from the light tunnel will exit from the light exit face at an angle of between −20° and 20° with respect to the optical axis. For example, it is provided for that light entering the transparent body through the light entry face will exit from the light exit face at an angle of between −20° and 20° relative φ the optical axis. For example, it is provided for that light entering the transparent body through the light entry face and, from the light tunnel, entering the passage section in the area of the bend, will exit from the light exit face essentially in parallel relative to the optical axis. For example, it is provided for that light entering the transparent body through the light entry face, will exit from the light exit face essentially in parallel relative to the optical axis.

In a further embodiment, the bend comprises an opening angle of at least 90°. In a further embodiment, the bend includes an opening angle of no more than 150°, preferably an opening angle of no more than 120°. In a further favourable embodiment, the bend is disposed on a surface of the light passage section, which surface is facing the light entry (sur-)face.

In a further embodiment, the orthogonal of the light entry face is inclined with respect to the optical axis of the light passage section. In a further embodiment, the light entry face is inclined with respect to the optical axis of the light passage section by an angle of between 5° and 70°, for example by an angle of between 20° and 50°.

In a further embodiment, the light tunnel comprises a region on its surface, which region essentially corresponds to a part of the surface of an ellipsoid. In a further embodiment, the light tunnel comprises a region on its surface, which region corresponds essentially to at least 15% of the surface of an ellipsoid.

In a yet further embodiment, the light tunnel comprises a region on its surface, for which region the following applies:

$$0{,}75 \cdot a \cdot \sqrt{1 - \frac{y^2}{b^2} - \frac{z^2}{c^2}} \le x \le 1{,}25 \cdot a \cdot \sqrt{1 - \frac{y^2}{b^2} - \frac{z^2}{c^2}}$$

-continued $$0{,}75 \cdot b \cdot \sqrt{1 - \frac{x^2}{a^2} - \frac{z^2}{c^2}} \le y \le 1{,}25 \cdot b \cdot \sqrt{1 - \frac{x^2}{a^2} - \frac{z^2}{c^2}},$$

in which
- z is a coordinate in the direction (of the optical axis) of the light tunnel;
- x is a coordinate orthogonal to the direction of the optical axis of the light tunnel;
- y is a coordinate orthogonal to the direction of the optical axis of the light tunnel;
- a is a number having a value greater than 0;
- b is a number having a value greater than 0; and
- c is a number having a value greater than 0.

In a further embodiment a surface of the light passage section facing the light tunnel is curved at least in the region of the bend towards the transition into the light tunnel, the curvature being, for example, convex. In a further embodiment, the bend is curved in its longitudinal extension. In a further embodiment, the bend is curved, in its longitudinal extension, the bend having a radius of curvature of between 5 mm and 100 mm. In a still further embodiment, the bend is curved, in its longitudinal extension, corresponding to a Petzval curve (also termed Petzval [sur]face).

In a further embodiment, the bend comprises, in its longitudinal extension, a curvature having a radius of curvature in the orientation of the optical axis of the light tunnel and/or of the light passage section. In a yet further preferred embodiment of the invention, the radius of curvature is orientated opposite to the light exit face.

In a further embodiment, the bend is curved in a first direction and in a second direction. In a further embodiment, the first direction is orthogonal to the second direction. In a still further embodiment, the bend is curved with a first radius of curvature in a first direction and with a second radius of curvature in a second direction, wherein the second radius of curvature is positioned orthogonal to the first radius of curvature.

In a further embodiment, a portion of the surface of the passage section facing the light tunnel has a configuration of a Petzval face. In a yet further embodiment, the surface of the light passage section facing the light tunnel is, in a region in which it forms a transition into the light tunnel, configured as a Petzval face.

In a further embodiment, the length of the headlight lens, when looked at in the orientation of the optical axis of the light tunnel and/or the light passage section, amounts to no more than 7 cm.

In a further embodiment, the headlight lens or the transparent body, respectively, includes a further light exit face as well as a further light entry face. In a further embodiment, at least 20% of the light entering the light entry face and exiting through the light exit face will exit through the light exit face, after having exited from the transparent body through the further light exit face, and after having entered the transparent body through the further light entry face. In a further embodiment, at least 10%, for example at least 20% of the light entering the light entry face and exiting through the light exit face will exit through the light exit face without having exited from the transparent body through the further light exit face and without having entered the transparent body through the further light entry face. In a further embodiment, at least 75% of the light entering the light entry face and exiting through the light exit face will exit through the light exit face after having exited from the transparent body through the further light exit face and after having entered the transparent body through the further light entry face. In a further embodiment, it is provided for that light which enters the transparent body through the light entry face and enters the light passage section from the light tunnel in the region of the bend will either exit from the transparent body from the further light exit face and enter the further light entry face of the transparent body as well as it will exit from the transparent body from the light exit face, or it will exit directly from the light exit face (without exiting from the transparent body from the further light exit face and without entering the further light entry face of the transparent body).

In a further embodiment, the vehicle headlight has no secondary optic associated with the headlight lens. A secondary optic is, in particular, an optic means for aligning light which exits from the light exit face or from the last light exit face of the headlight lens, respectively. A secondary optic is in particular an optical element for aligning light, which element is separated from and/or subordinated with regard to the headlight lens. A secondary optic is in particular no cover nor a protection disc, respectively, but an optical element provided for aligning light. An example of a secondary optic is e.g. a secondary lens as has been disclosed in DE 10 2004 043 706 A1.

In particular, it is provided for that the bend, which is imaged as a bright-dark-boundary lies in the lower region of the light tunnel.

The aforementioned object is, moreover, achieved by a headlight comprising a aforementioned headlight lens and a (first) light source for irradiating light into the light entry face.

In a yet further embodiment, the distance of the light source from the centre of the (first) light exit face, when seen in the orientation of the optical axis of the light tunnel and/or the light passage section amounts to no more than 10 cm. In a further embodiment, the length of the vehicle headlight, when seen in the orientation of the optical axis of the light tunnel and/or the light passage section amounts to no more than 10 cm.

In a further embodiment, the vehicle headlight comprises at least one second light source, which is spatially separated from the (first) light source, for making light enter or irradiating light into, respectively the light tunnel and/or directly (i.e. in particular without passing the light tunnel) into the light passage section. It may be provided for that a second light source comprises several partial light sources. In a further embodiment, the vehicle headlight comprises at least one second light source, which is spatially separated from the (first) light source, for making light enter a surface of the light passage section facing the light tunnel. In a further embodiment, light above and/or below the bright-dark-boundary is irradiated by means of the second light source.

In a further embodiment, the second light source includes a cornering light source disposed, for example, to the left of the optical axis of the light tunnel and/or above the optical axis of the light tunnel and/or of the light tunnel. In a further embodiment, the corner-light source is disposed between the (first) light entry face and the light passage section. In a further embodiment, the second light source includes a for example further cornering light source arranged, for example, to the right of the optical axis of the light tunnel, and/or above the optical axis of the light tunnel, and/or of the light tunnel. In a further embodiment, the corner-light source is disposed between the (first) light entry face and the light passage section.

In a further embodiment, the second light source comprises at least one partial light source disposed above the light tunnel. In a further embodiment, the second light source comprises at least two partial light sources, which are, for example, spatially separated from one another and disposed above the light tunnel. In a further embodiment, the second light source comprises at least one partial light source disposed below the light tunnel. In a further embodiment, the second light source comprises at least two partial light sources, which are, for example, spatially separated from one another and disposed below the light tunnel. In a further embodiment, the or one partial light source or several partial light sources is/are disposed between the (first) light entry face and the light passage section.

In an embodiment, a light source, a corner-light source and/or a partial light source comprise at least one LED or an array of LEDs. In an expedient embodiment, the light source comprises at least one OLED or an array of OLEDs. For example, the light source may well be an areal/planar luminous field. The light source may also comprise light element chips as have been disclosed in DE 103 15 131 A1. A light source may be a laser, as well. A suitable laser is disclosed in ISAL 2011 Proceedings, page 271ff.

In a further embodiment, the surface restricting the light tunnel for example in the upward direction, includes an indentation or notch extending (essentially) in the longitudinal direction and/or (essentially) in parallel to the optical axis of the light tunnel and/or to the optical axis of the light passage section and/or to the optical axis of the light exit face. In a yet further embodiment, the indentation separates two segments of the light tunnel, which for example emanate from the light entry face. In a further embodiment, a segment or a part of the segments comprises an area on its surface, which area essentially corresponds to a part of the surface of an ellipsoid. This area corresponds for example to the upper surface of a respective segment. In a further embodiment, the segments comprise an area on the surface, which corresponds essentially to a part of the surface of an ellipsoid. This area corresponds, in particular, to the upper surface of a respective segment.

It may be provided for that a light entry face and/or a light exit face include/s a light dispersing structure. A light dispersing structure may, for example, be a structure as has been disclosed in DE 10 2005 009 556 A1 and in EP 1 514 148 A1 and EP 1 514 148 B1, respectively.

The aforementioned object is, moreover, achieved by a headlight lens for example comprising one or several of the aforementioned features—for a vehicle headlight, for example for a motor vehicle headlight, wherein the headlight lens comprises a for example blank-molded, for example monolithic, body of transparent material, wherein the body comprises at least one light tunnel and at least one light passage section including at least one optically operative light exit face, wherein the light tunnel comprises at least one, for example optically operative, light entry face and, via a bend, forms transition into the light passage section for imaging the bend as a bright-dark-boundary by means of light made to enter or irradiated, respectively, into the light entry face, wherein the surface limiting the light tunnel in particular in the upward direction includes an indentation or at least two indentations (notches) extending at least (essentially) in the longitudinal direction and/or (essentially) in parallel to the optical axis of the light tunnel and/or to the optical axis of the light passage section and/or to the optical axis of the light exit face.

In a further embodiment, the indentation separates two segments of the light tunnel for example emanating from the light entry face. In a further embodiment a segment or a part of the segments comprises an area on its surface, which corresponds essentially to a part of the surface of an ellipsoid. This area corresponds, in particular, to the upper surface of a respective segment. In a further embodiment, the segments comprise an area on their surface, which essentially corresponds to a part of the surface of an ellipsoid. This area corresponds, in particular, to the upper surface of the respective segment.

In a further embodiment, the at least two indentations separate at least three segments of the light tunnel, said segments, for example, emanating from the light entry face.

The aforementioned object is, moreover, achieved by a headlight lens for example comprising one or several of the aforementioned features—for a vehicle headlight, for a motor vehicle headlight, wherein the headlight lens comprises a for example blank-molded, for example monolithic, body of transparent material, wherein the body comprises at least one light tunnel and at least one light passage section including at least one optically operative light exit face, wherein the light tunnel comprises at least one for example optically operative light entry face and, via a bend, forms transition into the light passage section for imaging the bend as a bright-dark-boundary by means of light made to enter or irradiated, respectively, into the light entry face, wherein the light tunnel includes at least two, for example at least three segments emanating from the light entry face.

A segment of the light tunnel extends, for example in its longitudinal alignment (essentially) in the longitudinal direction of the headlight lens and/or (essentially) in parallel to the optical axis of the light tunnel and/or to the optical axis of the light passage section and/or to the optical axis of the light exit face.

Herein a motor vehicle is, in particular, a land vehicle for individual use in road traffic. Herein, motor vehicles are, in particular, not restricted to land vehicles including a combustion engine.

DETAILED DESCRIPTION

Figure 1:
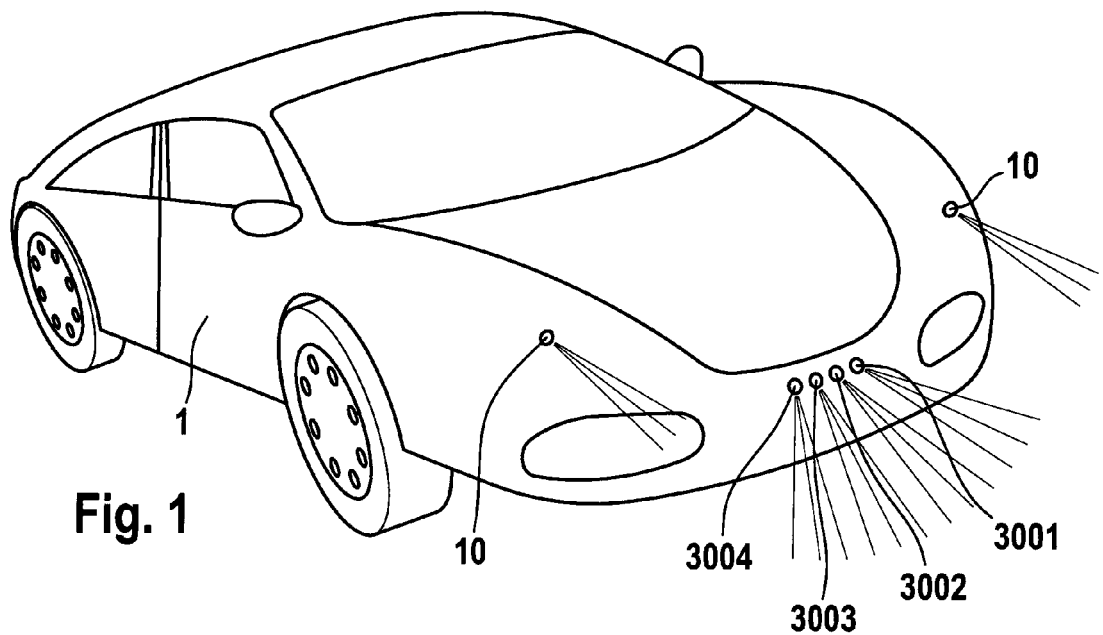
FIG. 1 shows an example of an embodiment of a motor vehicle.

FIG. 1 shows an example of embodiment of a motor vehicle 1 including motor vehicle headlights 10 and motor vehicle headlights/partial headlights 3001, 3002, 3003, and 3004, which are integrated in the body of the motor vehicle 1 within the central third of the front of the motor vehicle 1. The motor vehicle headlights 10 are, e.g., integrated in the body of the motor vehicle 1 within the marginal area of the front of the motor vehicle 1.

Figure 2:
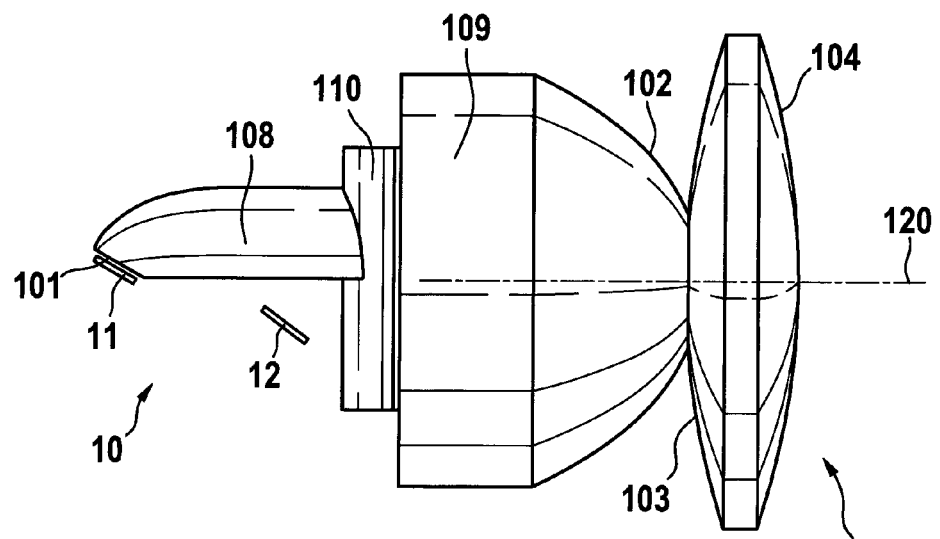
FIG. 2 shows an example of an embodiment of a headlight lens for implementation in the motor vehicle according to FIG. 1.
Figure 3:
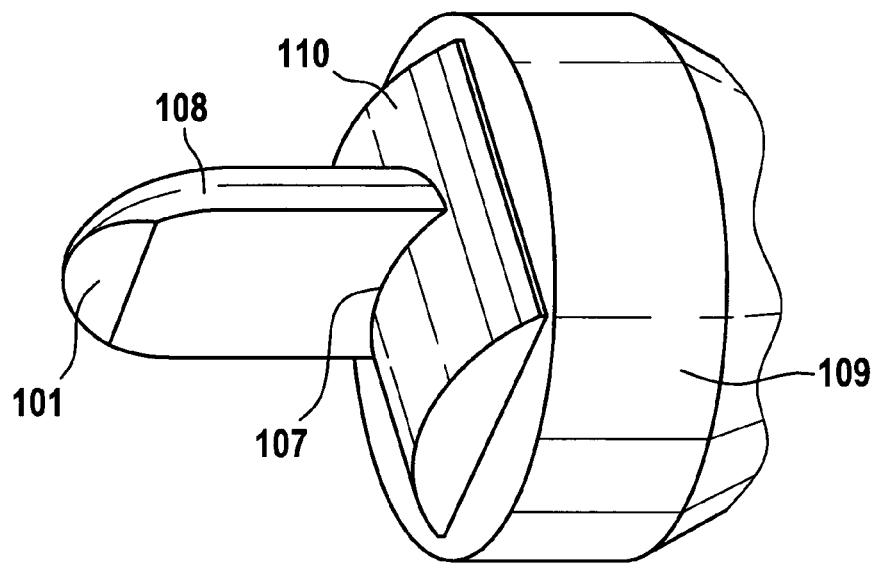
FIG. 3 shows a cut-out representation of a headlight lens of the motor vehicle headlight lens according to FIG. 2 by way of a perspective view from below.

FIG. 2 shows a side view of the motor vehicle headlight 10 including a headlight lens 100, but without any housing, fittings and energy supply, with the headlight lens 100 being represented in FIG. 3 in a cut-out manner by way of a perspective bottom view (view from below). The headlight lens 100 comprises a blank-molded monolithic body made from inorganic glass, for example glass which comprises 0.2 to 2% by weight $Al_2O_3$,
0.1 to 1% by weight $Li_2O$,
0.3, in particular 0.4, to 1.5% by weight $Sb_2O_3$,
60 to 75% by weight $SiO_2$,
3 to 12% by weight $Na_2O$,
3 to 12% by weight $K_2O$, and
3 to 12% by weight CaO.

The blank-molded monolithic body comprises a light tunnel 108, which, on its one side, has a light entry face 101 and, on another side, transits into a light passage (conductive) section 109 (of the blank-molded monolithic body) via a bend 107 curved in two spatial directions, which section 109 has a light exit face 102, a light entry face 103 as well as a further light exit face 104. The headlight lens 100 is configured such that light entering the headlight lens 100 through the light entry face 101 and, in the region of the bend 107 entering the passage section from the light tunnel 108, will exit from the light exit face 104 essentially in parallel to the optical axis 120 of the headlight lens 100. Herein, the light passage section 109 images the bend 107 as a bright-dark-boundary. A portion of the surface of the light passage section 109 facing the light tunnel 108 is configured as a Petzval surface, said surface portion having been designated by reference numeral 110.

The motor vehicle headlight 10 includes a light source 11 configured as an LED, and a light source 12 configured as an LED. By means of the light source 11, and for the purpose of implementing dipped-beam headlight, light is irradiated into or made to enter, respectively, the light entry face 101 of the light tunnel 108. By means of the light source 12 selectively connectable for implementing sign light or high-beam headlight, light is made to enter or is irradiated into, respectively, a bottom side of the light tunnel 108 or the portion 110 of the surface of the light passage section 109 facing the light tunnel 108 and configured as a Petzval face.

Figure 4:
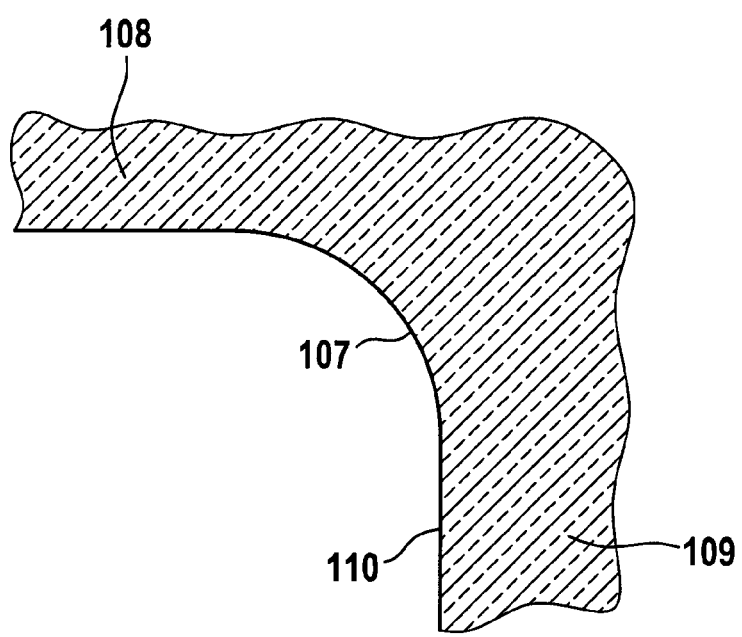
FIG. 4 shows an enlarged representation of a cut-out cross section of a bend for the transition of a light tunnel into a light passage section of a headlight lens according to FIG. 3.

FIG. 4 shows, by way of an enlarged representation, a cut-out of the bend 107 for transition of the light tunnel 108 into the light passage section 109. The bend 107 is formed by blank—molding and configured as a continuous, curved transition having a radius of curvature of at least 0.15 mm.

Figure 5:
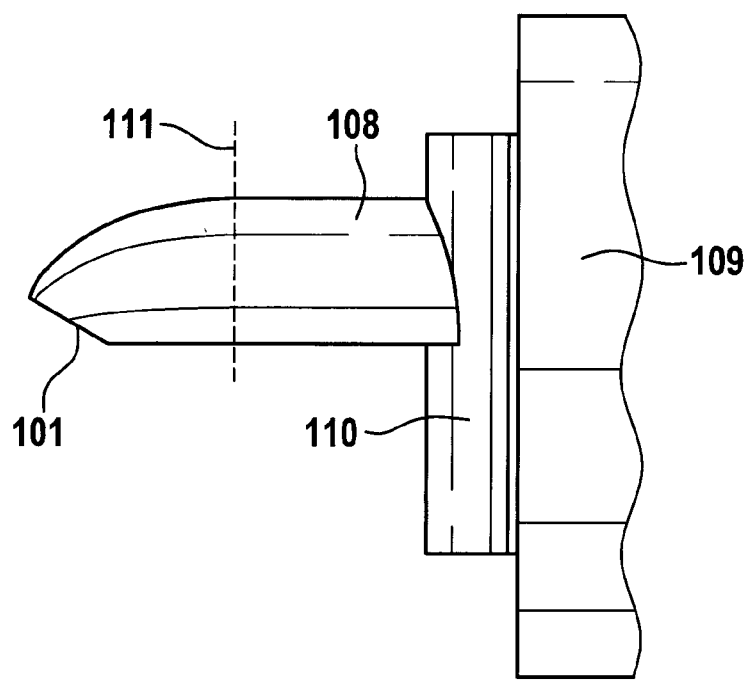
FIG. 5 shows a cut-out representation of a headlight lens according to FIG. 3 by way of a side view.
Figure 6:
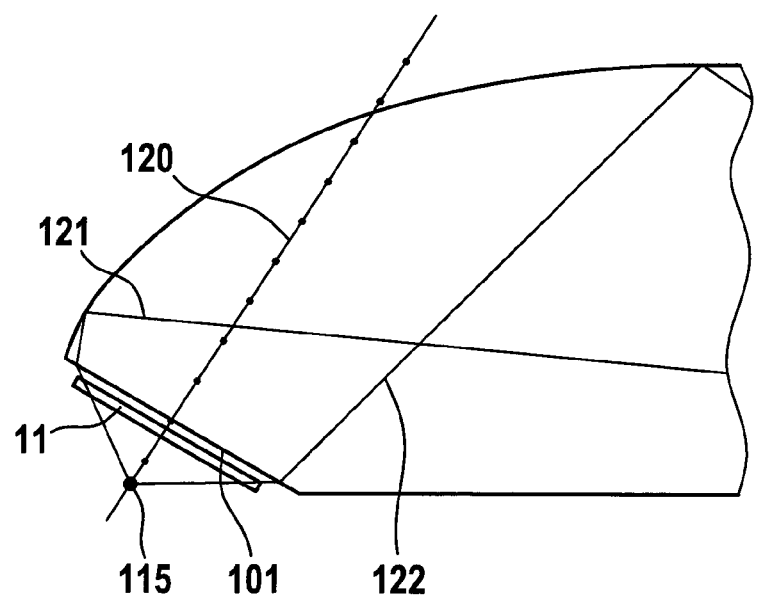
FIG. 6 shows a cut-out representation of a light tunnel of the headlight lens of FIG. 3 by way of a side view.
Figure 7:
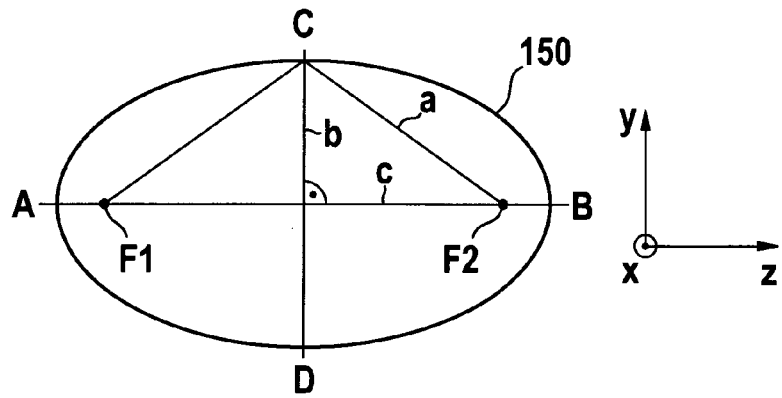
FIG. 7 shows an example of embodiment of an ellipsoid.
Figure 8:
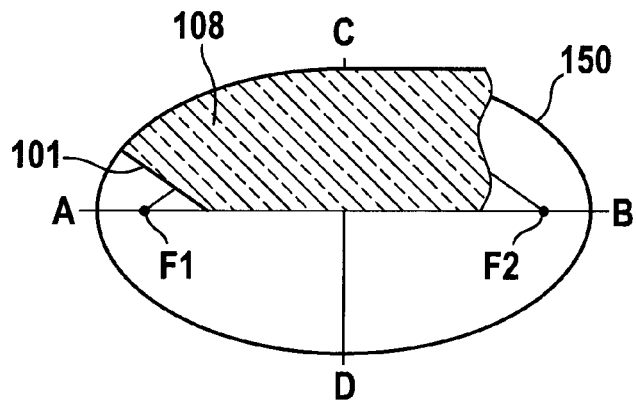
FIG. 8 shows the ellipsoid according to FIG. 7 with a superimposing representation of a portion of the light tunnel represented in FIG. 6 by way of a cross sectional representation.

FIG. 5 shows a cut-out representation of a side view of the headlight lens 100. FIG. 6 shows an enlarged cut-out representation of a part of the light tunnel 108 up to the dotted line in FIG. 5 designated by reference numeral 111. The upper portion of the part of the light tunnel as shown in FIG. 6 has been configured as an ellipsoid 150 as represented in FIG. 7. Herein, the dotted line 111 approximately corresponds to the axis C-D. For clarifying this embodiment, a part of the cross section of the light tunnel 108 is shown in FIG. 8 in a manner superimposing the representation of the ellipsoid 150. For the ellipsoid 150 as represented in FIG. 7 the following equation applies:

$$\frac{x^2}{a^2} + \frac{y^2}{b^2} + \frac{z^2}{c^2} - 1 = 0$$

In this equation z is a coordinate in the direction of the optical axis of the light tunnel (A→B);
x is a coordinate orthogonal with respect to the direction of the optical axis of the light tunnel; and
y is a coordinate orthogonal with respect to the direction of the optical axis of the light tunnel and to the x-direction (DC).

a, b and, consequently, c have been chosen such that all light beams which pass through focus F1 will concentrate again in focus F2 after mirroring in the surface of the ellipsoid. The course of the beams of light from the light source 11, which is irradiated into or made to enter, respectively, the light entry face 101, is made clear by the light beams 121 and 122 depicted in FIG. 6. Reference numeral 120 of FIG. 6 designates the orthogonal of the light entry face 101. The mutual point of intersection of the orthogonal 120 of the light entry face 101 with the light beams 121 and 122 has been designated by reference numeral 115. The position of this point of intersection 115 corresponds to focus F1 in FIG. 7 and FIG. 8.

Figure 9:
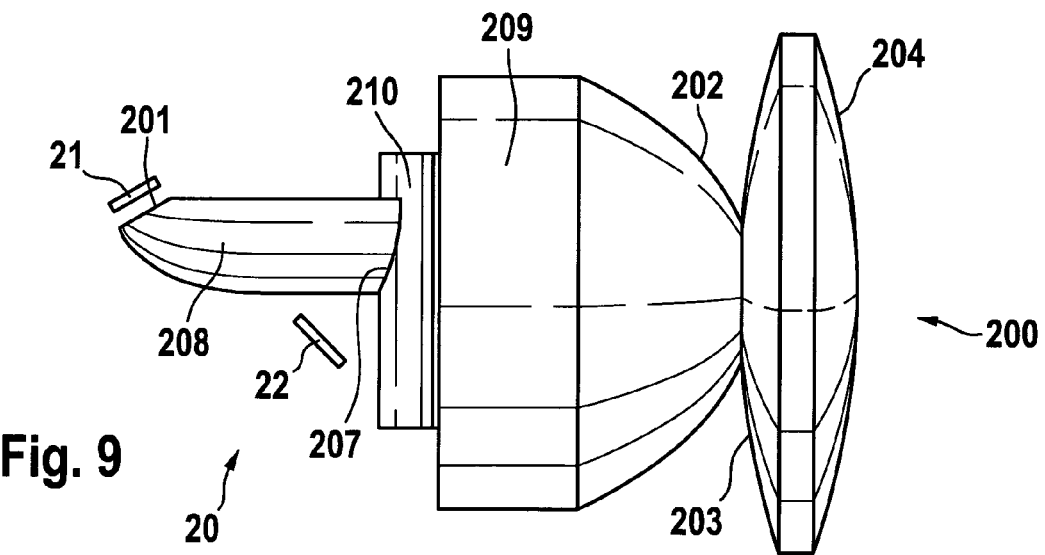
FIG. 9 shows a side view of an alternative example of embodiment of a motor vehicle headlight (for use in the motor vehicle according to FIG. 1)

FIG. 9 shows, by way of a side elevation, a motor vehicle headlight 20 to be used alternatively instead of motor vehicle headlight 10. The motor vehicle headlight 20 comprises a headlight lens 200. The headlight lens 200 comprises a blank-molded monolithic body made from inorganic glass and comprising a light tunnel 208, which has a light entry face 201 on one side and, on another side, forms transition into a light passage section 209 (of the blank-molded monolithic body) via a bend 207 curved in three spatial dimensions, which light passage section 209 includes a light exit face 202, a light entry face 203, as well as a further light exit face 204. The headlight lens 200 is configured such that light, which enters the headlight lens 200 through the light entry face 201, and enters the passage section from the light tunnel 208 in the region of the bend 207, will exit from the light exit face 204 essentially in parallel to the optical axis of the headlight lens 200. Herein, the light passage section 209 images the bend 207 as a bright-dark-boundary. A portion of the surface of the light passage section 209 designated by reference numeral 210 and facing the light tunnel 208 is configured as a Petzval surface.

The vehicle headlight 20 includes a light source 21 configured as an LED, and a light source 22 configured as an LED. By means of the light source 21, and for the purpose of implementing dipped-beam headlight, light is irradiated into or made to enter, respectively, the light entry face 201 of the light tunnel 208. By means of the light source 22 selectively connectable for implementing sign light or drive light, light is made to enter or is irradiated into, respectively, a bottom side of the light tunnel 208 or the portion 210 of the surface of the light passage section 209 facing the light tunnel 208, which portion is configured as a Petzval face.

Figure 10:
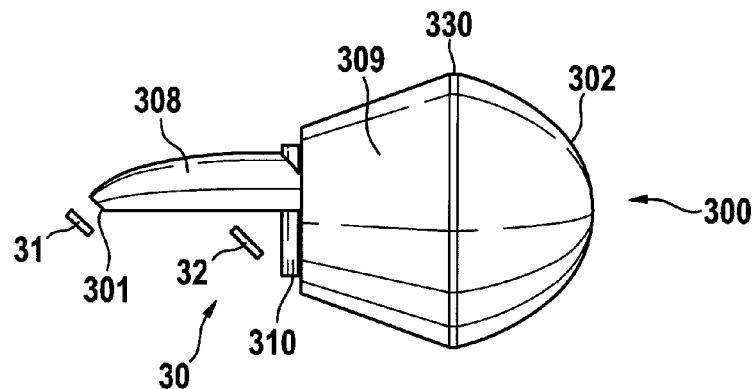
FIG. 10 shows a side view of a further alternative example of embodiment of a motor vehicle headlight (for use in the motor vehicle according to FIG. 1)
Figure 11:
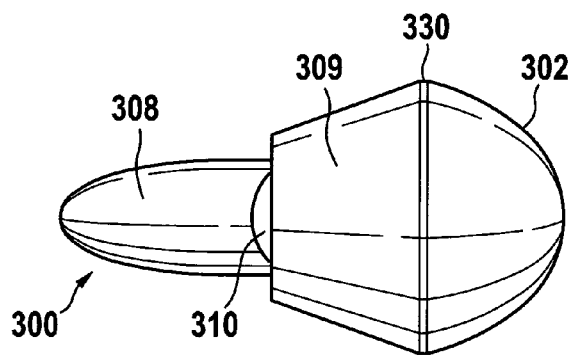
FIG. 11 shows an example of embodiment of a headlight lens of the motor vehicle headlight according to FIG. 10 by way of a top view.
Figure 12:
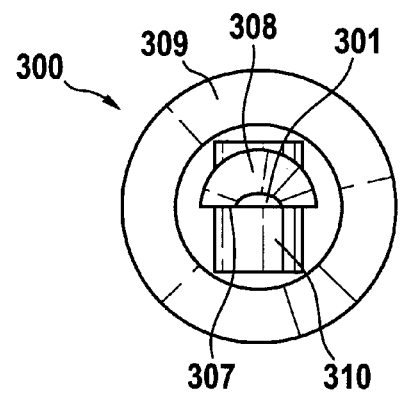
FIG. 12 shows the headlight lens according to FIG. 11 by way of a rear view.
Figure 13:
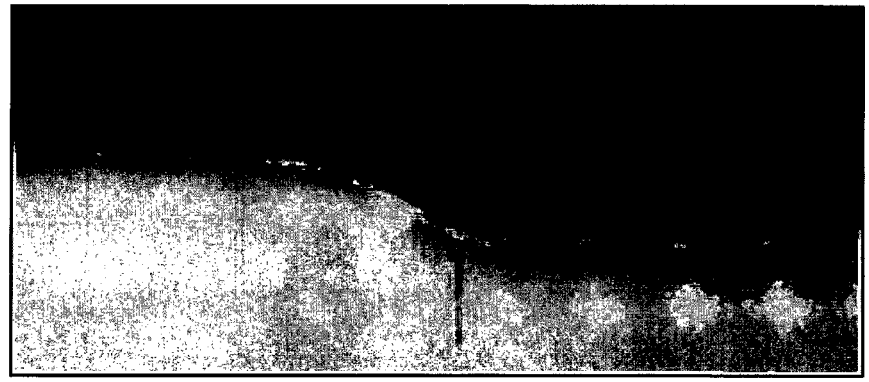
FIG. 13 shows a bright-dark-boundary generated by means of the motor vehicle headlight according to FIG. 10.

FIG. 10 shows a further motor vehicle headlight 30 by way of a side elevation and to be used alternatively with regard to motor vehicle headlight 10. The motor vehicle headlight 30 comprises a headlight lens 300. FIG. 11 shows the headlight lens 300 by way of a top view, and FIG. 12 shows the headlight lens 300 from the rear. The headlight lens 300 comprises a blank-molded monolithic body made from inorganic glass, which body comprises a light tunnel 308, which has a light entry face 301 on one side and, on the other side, passes over into a light passage section 309 (of the blank-molded monolithic body) via a bend 307 curved in two spatial dimensions, which light passage section 309 includes a light exit face 302. The headlight lens 300 is configured such that light which enters the headlight lens 300 through the light entry face 301 and, from the light tunnel 308 enters the passage section in the region of the bend 307, will exit from the light exit face 302 essentially in parallel to the optical axis of the headlight lens 300. Herein, the light passage section 309 images the bend 307 as a bright-dark-boundary, just as it has been depicted in FIG. 13. The surface of the light passage section 309 facing the light tunnel 308 has a portion designated by reference numeral 310 and is configured as a Petzval surface. A rim or edge, for example a circumferential edge, may be provided on the section designated by reference numeral 330 of the surface of the passage section 309, by means of which edge the headlight lens 300 may be fixedly mounted in a particularly suitable manner.

The vehicle headlight 30 includes a light source 31 configured as an LED, and a light source 32 configured as an LED. By means of light source 31, and for the purpose of implementing dipped-beam headlight, light is irradiated into or made to enter, respectively, the light entry face 301 of the light tunnel 308. By means of the selectively connectable light source 32 for implementing sign light or drive light, light is made to enter or is irradiated, respectively, into a bottom side of the light tunnel 308 or into the portion 310 configured as a Petzval surface, of the surface of the light passage section 309 facing the light tunnel 308.

Figure 14:
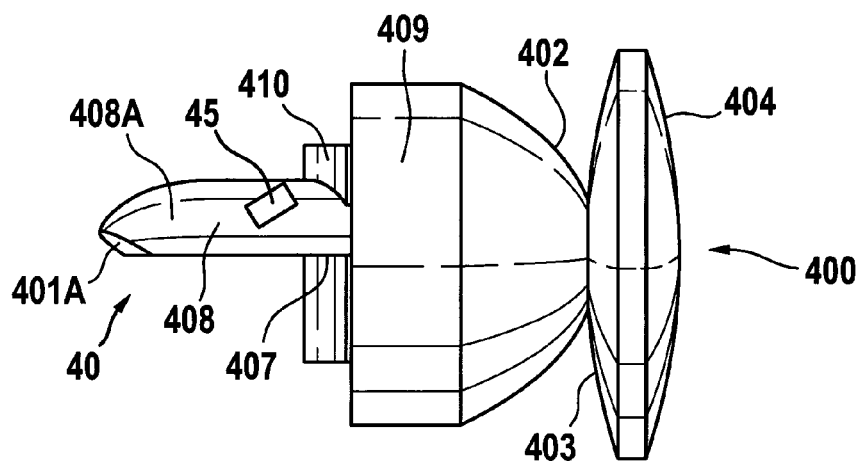
FIG. 14 shows a side view of a further alternative example of embodiment of a motor vehicle headlight (for use in the motor vehicle according to FIG. 1)
Figure 15:
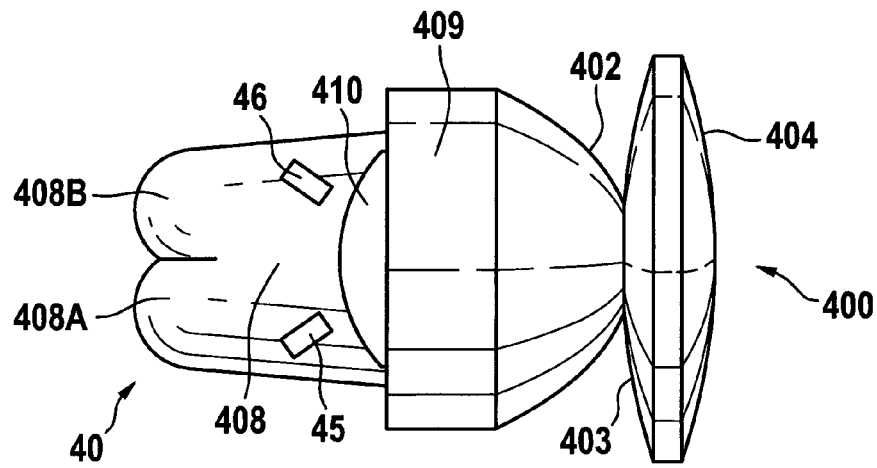
FIG. 15 shows the motor vehicle headlight according to FIG. 14 by way of a top view.
Figure 16:
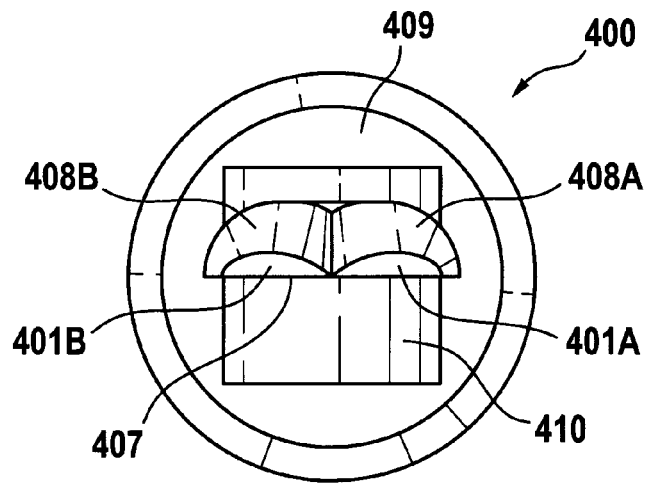
FIG. 16 shows an example of embodiment of the headlight lens of the motor vehicle headlight according to FIG. 14 by way of a rear view.

FIG. 14 shows a further motor vehicle headlight 40 by way of a side elevation and to be used alternatively with regard to the motor vehicle headlight 10. The motor vehicle headlight 40 comprises a headlight lens 400. FIG. 15 shows the motor vehicle headlight 40 by way of a top view and FIG. 16 shows the headlight lens 400 from the rear. The headlight lens 400 comprises a blank-molded monolithic body made from inorganic glass, which body includes a light tunnel section 408A and a light tunnel section 408B, both of which open out in a light tunnel 408 which, in turn, passes over to a light passage section 409 (of the blank-molded monolithic body) via a bend 407 curved in two spatial directions, which section 409 includes a light exit face 402, a light entry face 403, as well as a further light exit face 404. The light tunnel section 408A has a light entry face 401A, and the light tunnel section 408B has a light entry face 401B. The headlight lens 400 is configured such that light, which enters the headlight lens 400 through the light entry faces 401A and 401B and, in the region of the bend 407 enters the passage section from the light tunnel 408, will exit from the light exit face 404 essentially in parallel to the optical axis of the headlight lens 400. Herein, the light passage section 409 images the bend 407 as a bright-dark-boundary. A portion of the surface of the light passage section 409 designated by reference numeral 410 and facing the light tunnel 408 is configured as a Petzval surface.

Figure 17:
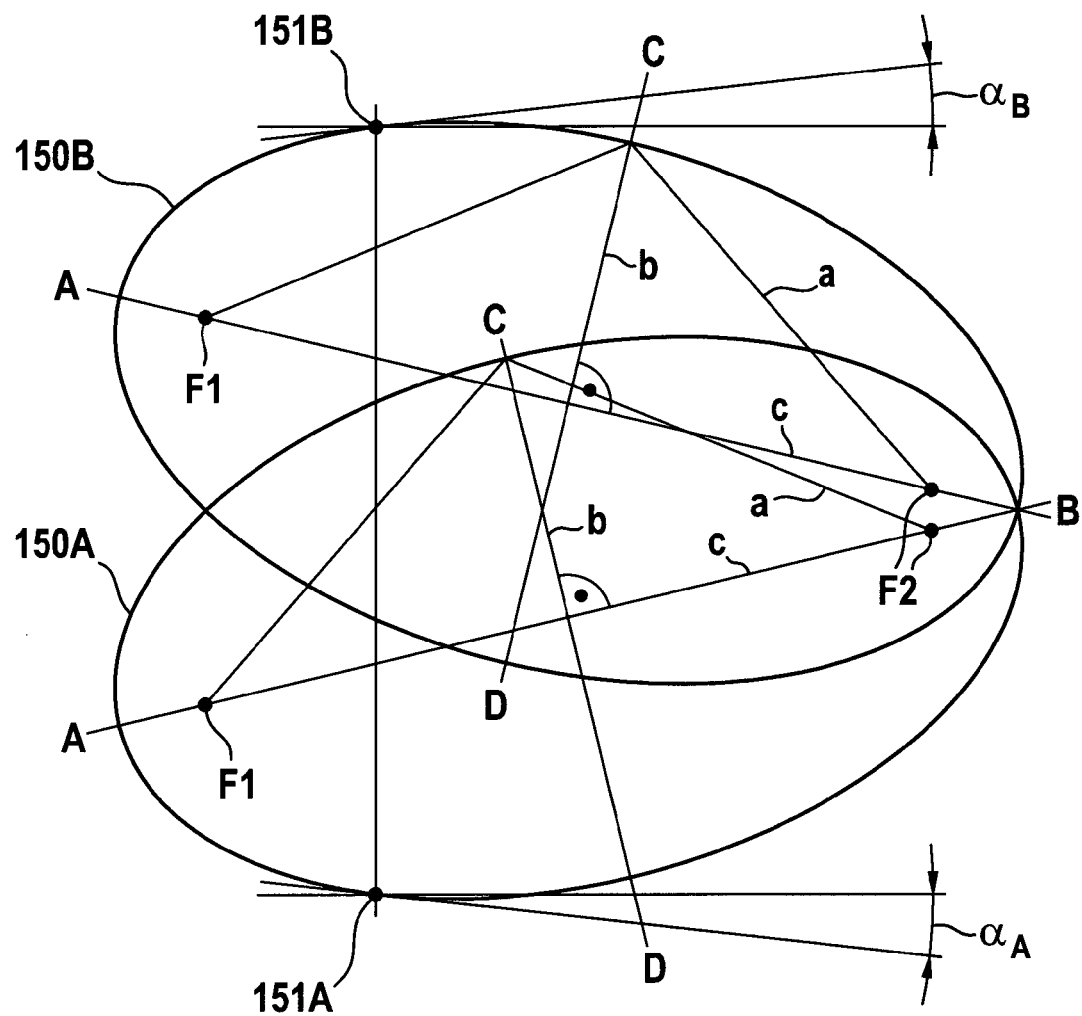
FIG. 17 shows a principle representation of an example of embodiment of the superimposition of two ellipsoids.

At least in their upper region, the light tunnel sections 408A and 408B are configured—in analogy to the explanations relating to FIG. 6—as part of an ellipsoid, as has been represented in principle in FIG. 17. Herein, reference numeral 150A designates an ellipsoid associated with the light tunnel section 408A, and reference numeral 150B designates an ellipsoid associated with the light tunnel section 408B. The ellipsoids 150A and 150B are—as has been represented in FIG. 17—aligned, in relation to each other, such that the respective focuses F2 will lie on top of each other. At the points designated by reference numerals 151A and 151B or starting at points 151A and 150B, respectively, (in the direction of light propagation or towards the right, respectively), the surface contour of the headlight lens 400 deviates from the contour of an ellipsoid. Herein, the angles $\alpha_A$ and $\alpha_B$ indicate the directions of deviation from the elliptic shape.

The motor vehicle headlight 40 includes two light sources, which, in analogy to light source 11 have been configured as LEDs and have not been depicted in FIG. 14 and FIG. 16 for the sake of clarity. By means of one of the light sources, and for the purpose of implementing dipped-beam headlight, light is irradiated into or made to enter, respectively, the light entry face 401A of the light tunnel section 408A, and by means of the other one of the light sources, and for the purpose of implementing dipped-beam headlight, light is irradiated into or made to enter, respectively, the light entry face 401B of the light tunnel section 408B. In addition, a not shown light source may be provided which corresponds to light source 12 with respect to position and performance.

In addition, and for implementing a corner light and/or a front fog light (adverse weather lamp) light sources 45 and 46 configured as LEDs are provided, with the light sources 45 and 46 being alternately connectable for implementing the corner light. Herein, a not shown control means is provided for within the motor vehicle 4, by means of which control means the light source 45 is switched on for the time of driving round a left corner, and light source 46 is switched on for the time of driving round a right corner. For implementing a front fog light, either the light source 46, alone, is or both light sources 45 and 46 are switched on.

Figure 18:
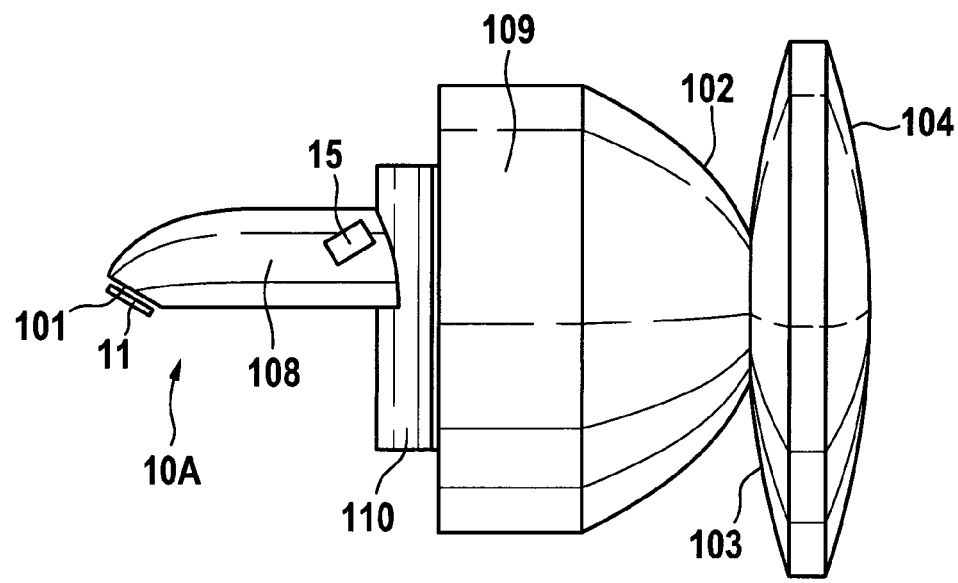
FIG. 18 shows a side view of a further example of embodiment of a motor vehicle headlight for use in the motor vehicle according to FIG. 1.
Figure 19:
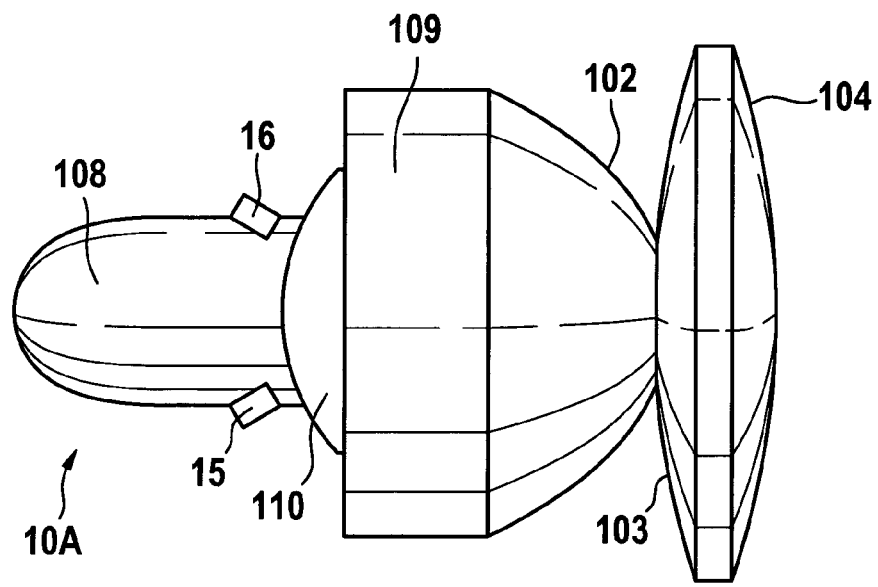
FIG. 19 shows the motor vehicle headlight according to FIG. 18 by way of a top view.

FIG. 18 and FIG. 19 show a motor vehicle headlight 10A to be used alternatively with regard to motor vehicle headlight 10. Herein, FIG. 18 shows the motor vehicle headlight 10A in a side elevation and FIG. 19 shows the motor vehicle headlight 10A in a top view. The motor vehicle headlight 10A comprises the headlight lens 100 as well as the light source 11. In addition, for implementing a corner light and/or a front fog light, light sources 15 and 16 configured as LED's have been provided. It may as well be provided for that, in addition, the light source 12 is implemented within the motor vehicle headlight 10A.

For implementing a corner light, the light sources 15 and 16 may be switched on alternately. In this context, a not shown control means is provided for in the motor vehicle 1, by means of which the light source 15 may be switched-on for the time of driving round a left corner and light source 16 may be switched on for the time of driving round a right corner. For implementing a front fog light either the light source 16, only, or both light sources 15 and 16 are switched on.

Figure 20:
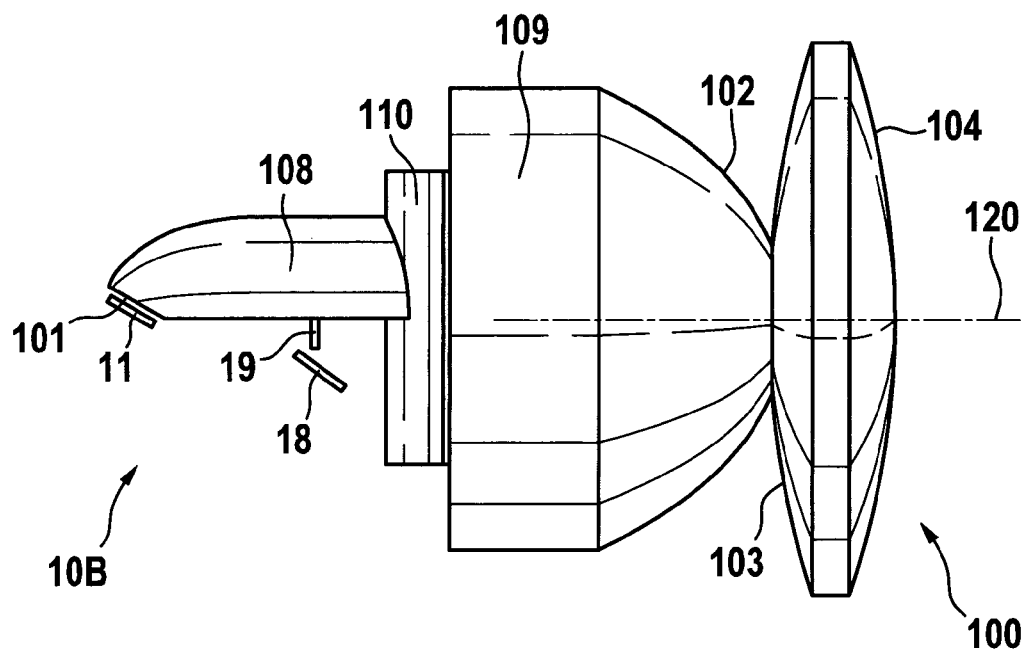
FIG. 20 shows a side view of a further example of an embodiment of a motor vehicle headlight for use in the motor vehicle according to FIG. 1.

FIG. 20 shows a motor vehicle headlight 10B (based on headlight lens 100) to be used alternately with regard to motor vehicle headlight 10 and including a light source 18 for a drive light function configured as an LED and adapted to be connected, and a light source 19 configured as an LED for a sign light function, wherein the light output of the light source 18 is higher than that of light source 19.

Figure 21:
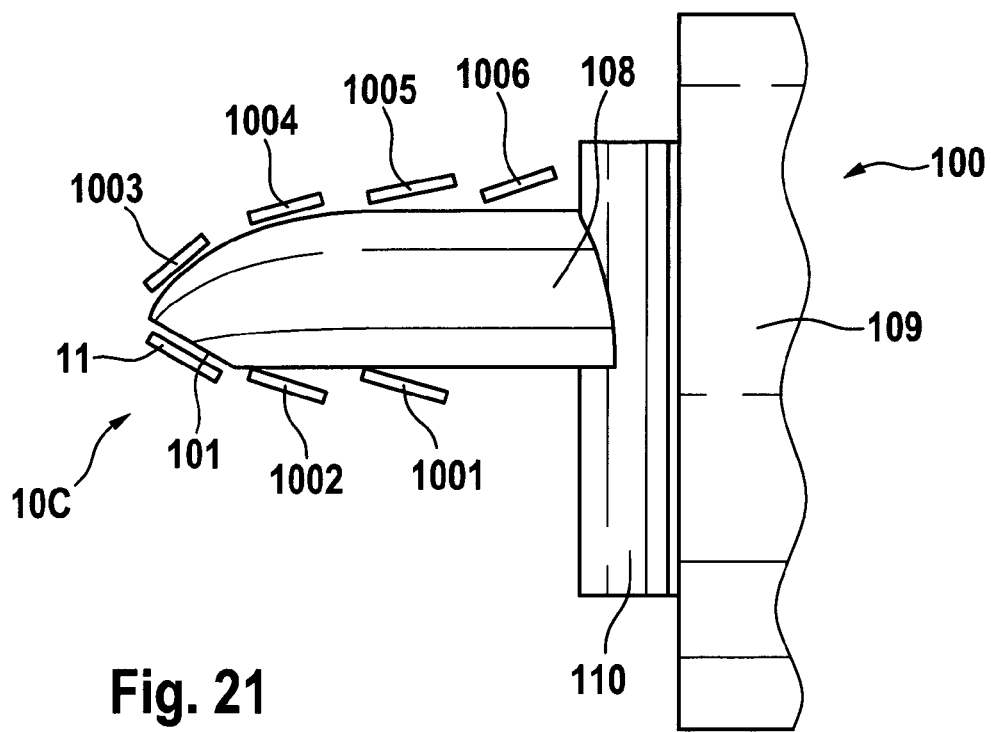
FIG. 21 shows a cut-out side elevation of a further example of embodiment of a motor vehicle headlight for use in the motor vehicle according to FIG. 1.

FIG. 21 shows a further motor vehicle headlight 10C based on headlight lens 100 and to be used alternatively instead of motor vehicle headlight 10. Herein, additional light sources 1001, 1002, 1003, 1004, 1005, and 1006 are provided along the light tunnel 108. By means of this arrangement, a higher light output may be achieved. The light sources 1003, 1004, 1005, 1006 or one or several of the light sources 1003, 1004, 1005, and 1006 may be provided in context with the motor vehicle headlight 10B as well.

Figure 22:
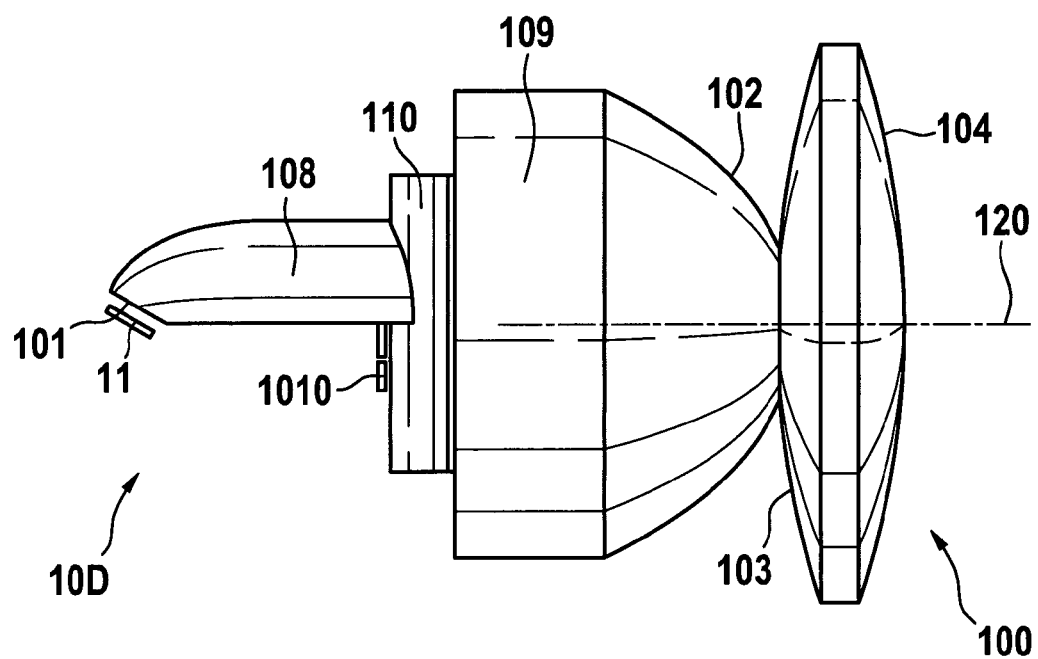
FIG. 22 shows a side elevation of a further example of embodiment of a motor vehicle headlight for use in the motor vehicle according to FIG. 1.
Figure 23:
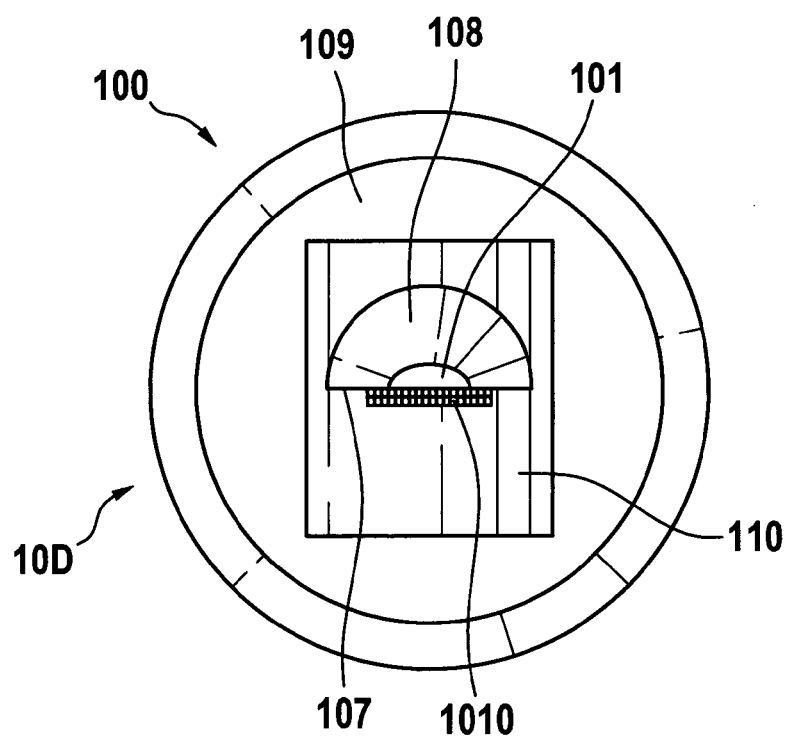
FIG. 23 shows a view from the rear of the motor vehicle headlight according to FIG. 22.

FIG. 22 shows a further motor vehicle headlight 10D based on headlight lens 100 and alternatively to be used instead of motor vehicle headlight 10. FIG. 23 shows the motor vehicle headlight 10D from the rear, however without the light source 11. Herein, by means of an LED array 1010 light is made to enter the Petzval-face-configured surface 110 of the passage section 109, the components of which array being adapted to be individually controlled or connected, respectively.

Figure 24:
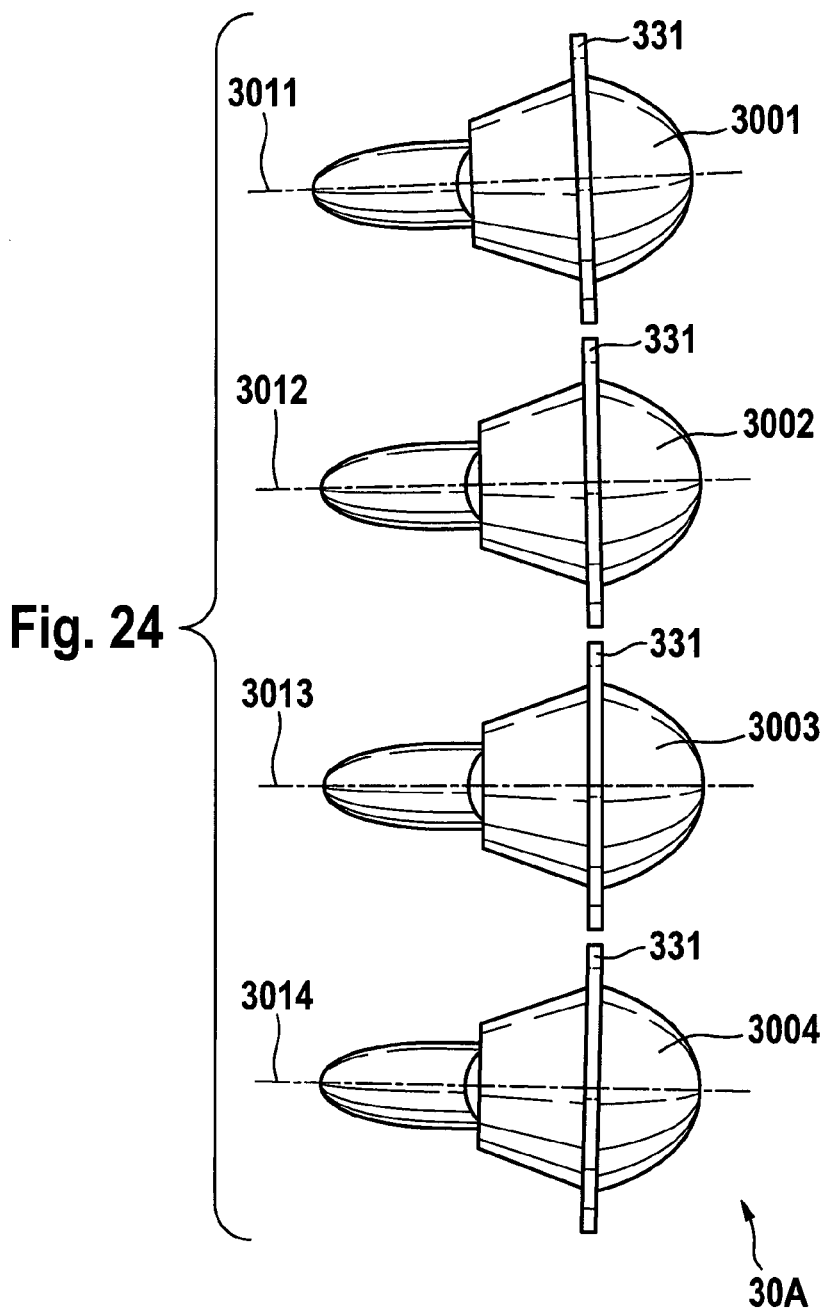
FIG. 24 shows a top view of a further example of embodiment of a motor vehicle headlight for use in the motor vehicle according to FIG. 1.

FIG. 24 shows a top view of an example of embodiment for an alternatively applicable motor vehicle headlight arrangement 30A. The motor vehicle headlight arrangement 30A includes the partial headlights 3001, 3002, 3003, and 3004, which have headlight lenses configured in analogy to headlight lens 300, each, however, having a circumferential rim or edge 331 with differently configured bends, so that the bright-dark-boundary 3005 represented in FIG. 25 will be brought about. It may be provided for that the partial headlights 3001, 3002, 3003, and 3004 may have LED arrays corresponding to LED array 1010.

It may be provided for that instead of the partial headlight 3001 the motor vehicle headlight 10, the motor vehicle headlight 10A, the motor vehicle headlight 10B, the motor vehicle headlight 10C, the motor vehicle headlight 10D, the motor vehicle headlight 10E, the motor vehicle headlight 20, the motor vehicle headlight 40, or the motor vehicle headlight 80 will be used, wherein the respective bends correspond to the bend of partial headlight 3001. It may be provided for that instead of the partial headlight 3002 the motor vehicle headlight 10, the motor vehicle headlight 10A, the motor vehicle headlight 10B, the motor vehicle headlight 10C, the motor vehicle headlight 10D, the motor vehicle headlight 10E, the motor vehicle headlight 20, the motor vehicle headlight 30B, the motor vehicle headlight 40, or the motor vehicle headlight 80 will be used, the associated bends corresponding to the bend of partial headlight 3002. It may be provided for that instead of the partial headlight 3003 the motor vehicle headlight 10, the motor vehicle headlight 10A, the motor vehicle headlight 10B, the motor vehicle headlight 10C, the motor vehicle headlight 10D, the motor vehicle headlight 10E, the motor vehicle headlight 20, the motor vehicle headlight 30B, the motor vehicle headlight 40, or the motor vehicle headlight 80 will be used, the associated bends corresponding to the bend of partial headlight 3003. It may be provided for that instead of the partial headlight 3004 the motor vehicle headlight 10, the motor vehicle headlight 10A, the motor vehicle headlight 10B, the motor vehicle headlight 10C, the motor vehicle headlight 10D, the motor vehicle headlight 10E, the motor vehicle headlight 20, the motor vehicle headlight 30B, the motor vehicle headlight 40, or the motor vehicle headlight 80 will be used, the associated bends corresponding to the bend of partial headlight 3004.

Figure 25:
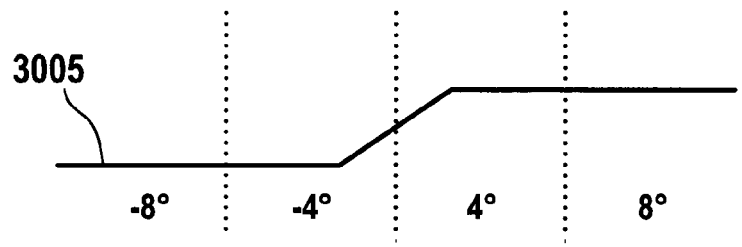
FIG. 25 shows a bright-dark-boundary generated by means of the motor vehicle headlight according to FIG. 24.

The optical axes 3011, 3012, 3013, and 3014 of the partial headlights 3001, 3002, 3003, and 3004, respectively, lie in a horizontal plane and are slightly inclined therein with respect to each other so that the partial headlight 3001 illuminates essentially the −8°-region, the partial headlight 3002 illuminates essentially the −4° region, the partial headlight 3003 illuminates essentially the 4° region and the partial headlight 3004 illuminates essentially the 8° region, respectively, (cf. FIG. 25). It may be provided for that the partial headlights 3001, 3002, 3003, and 3004 be fixedly connected with each other within a module. It may be provided for that the partial headlights 3001, 3002, 3003, and 3004 are disposed in a mutual housing. It may also be provided for that the partial headlights 3001, 3002, 3003, and 3004, as well as further corresponding partial headlights are disposed along the circumference of a geometrical figure, for example along a circle.

Figure 26:
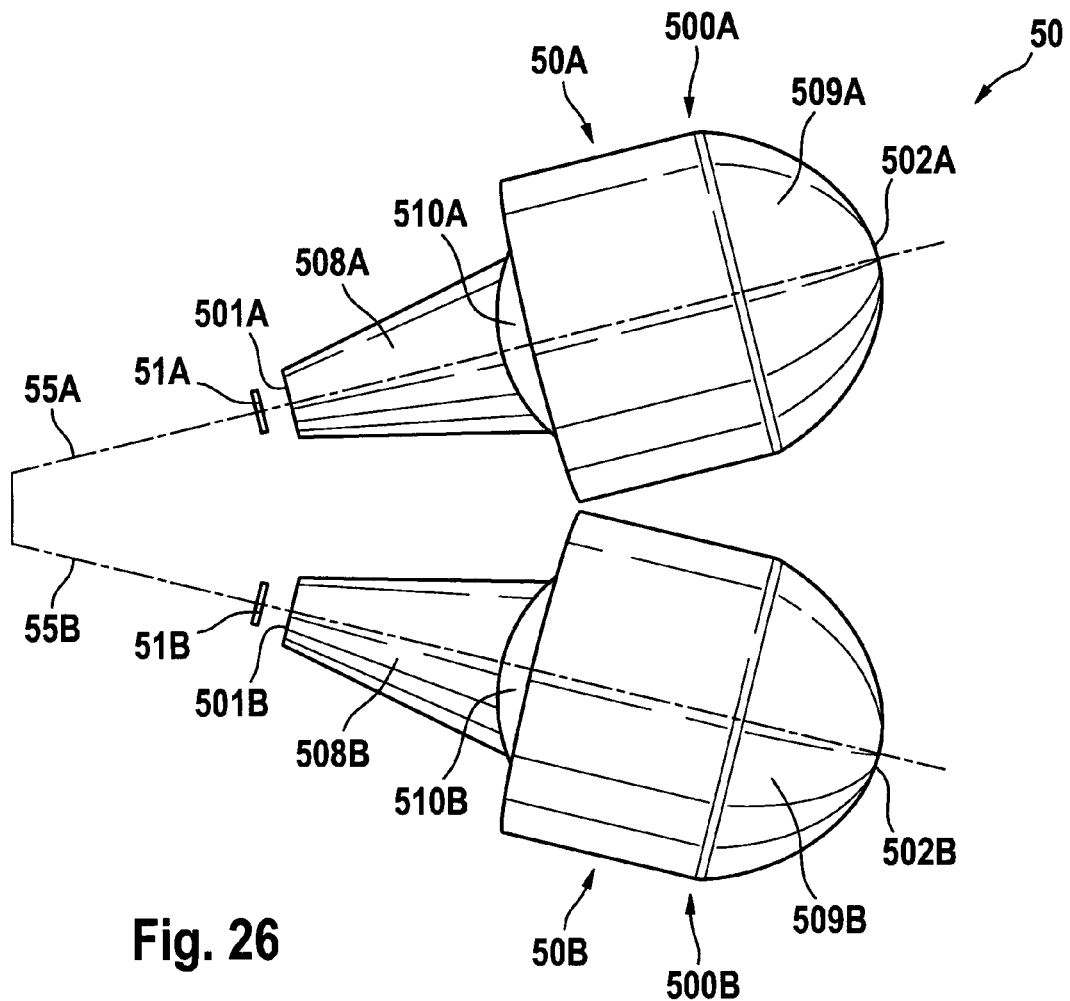
FIG. 26 shows a top view of an example of embodiment of a motor vehicle headlight array for use in the motor vehicle according to FIG. 1.

FIG. 26 shows a motor vehicle headlight arrangement 50 by way of a top view and to be used alternatively with regard to motor vehicle headlight 10. The motor vehicle headlight arrangement 50 includes partial headlights designated by reference numerals 50A and 50B. The partial headlight 50A comprises a headlight lens 500A. The headlight lens 500A comprises a blank-molded monolithic body of inorganic glass and including a light tunnel 508A, which has a light entry face 501A on one side and, on another side (on the bottom side of the headlight lens 500A), passes over into a light passage section 509A (of the blank-molded monolithic body) via a bend curved in two spatial dimensions, which light conductive section 509A includes a light exit face 502A. The headlight lens 500A is configured such that light, which enters the headlight lens 500A through the light entry face 501A, and from the light tunnel 508A enters the passage section in the region of the bend, will exit from the light exit face 502A essentially in parallel to the optical axis 55A of the headlight lens 500A. Herein, the light passage section 509A images the bend as a bright-dark-boundary 550, as has been represented in FIG. 37. Herein, the partial headlight 50A illuminates essentially the region between −20° and 0°. A portion of the surface of the light passage section 509A, which portion is facing the light tunnel 508A and has been designated by reference numeral 510A, is configured as a Petzval surface. The partial headlight 50A includes a light source 51A configured as an LED. For implementing a dipped-beam headlight, light is irradiated into or made to enter, respectively, the light entry face 501A of the light tunnel 508A by means of the light source 51A.

Figure 27:
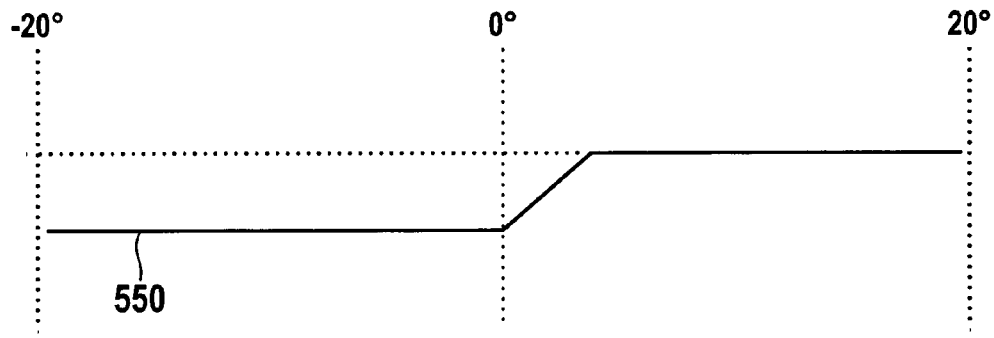
FIG. 27 shows a bright-dark-boundary generated by means of the motor vehicle headlight according to FIG. 24.

The partial headlight 50B comprises a headlight lens 500B. The headlight lens 500B comprises a blank-molded monolithic body made from inorganic glass, which comprises a light tunnel 508B, which has a light entry face 501B on one side and, on another side (on the bottom side of the headlight lens 500B) forms transition into a light passage section 509B (of the blank-molded monolithic body) via a bend curved in two spatial dimensions, which light passage section 509B includes a light exit face 502B. The headlight lens 500B is configured such that light, which enters the headlight lens 500B through the light entry face 501B, and from the light tunnel 508B enters the passage section in the region of the bend, will exit from the light exit face 502B essentially in parallel to the optical axis 55B of the headlight lens 500B. Herein, the light passage section 509B images the bend as a bright-dark-boundary 550, as has been represented in FIG. 27. Herein, the partial headlight 50A illuminates essentially the region between 0° and 20°. A portion of the surface of the light passage section 509B, which portion is facing the light tunnel 508B and has been designated by reference numeral 510B, is configured as a Petzval surface. The partial headlight 50B includes a light source 51B configured as an LED. For implementing dipped-beam headlight, light is irradiated into or made to enter, respectively, the light entry face 501B of the light tunnel 508B by means of the light source 51B. The optical axes 55A and 55B lie in one horizontal plane and, in this plane, are inclined by 25° with regard to each other.

Figure 28:
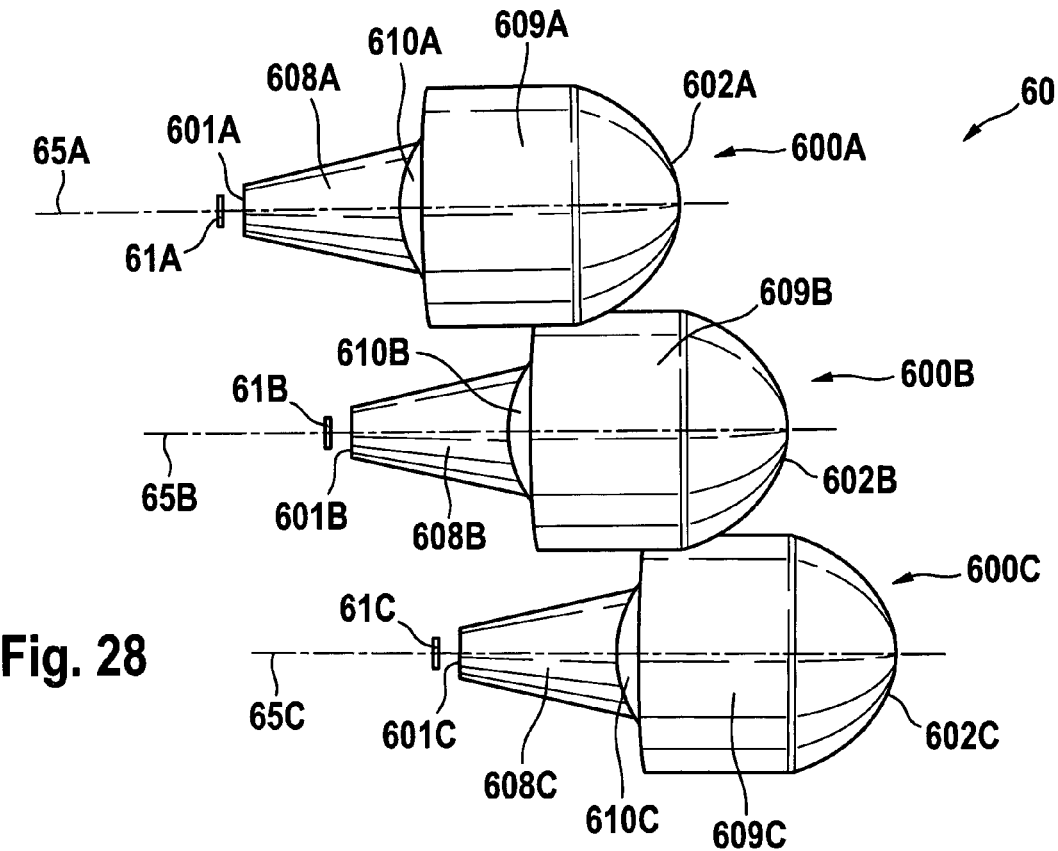
FIG. 28 shows a top view of a further example of embodiment of a motor vehicle headlight for use in the motor vehicle according to FIG. 1.

FIG. 28 shows, by way of a top view, a further motor vehicle headlight 60 alternatively to be used instead of motor vehicle headlight 10. The motor vehicle headlight 60 comprises a blank-molded monolithic body of inorganic glass, which body comprises a headlight lens part 600A, a headlight lens part 600B, and a headlight lens part 600C.

The headlight lens part 600A comprises a light tunnel 608A, which has a light entry face 601A on one side and, on another side (on the bottom side of the headlight lens part 600A), passes over (forms transition) into a light passage or conductive section 609A of the headlight lens part 600A via a bend curved in two spatial dimensions, which light passage section 609A includes a light exit face 602A. The headlight lens part 600A is configured such that light, which enters the headlight lens 600A through the light entry face 601A, and from the light tunnel 608A enters the passage section in the region of the bend, will exit from the light exit face 602A essentially in parallel to the optical axis 65A of the headlight lens part 600A. Herein, the light passage section 609A images the bend as a bright-dark-boundary. A portion of the surface of the light passage section 609A, which portion is facing the light tunnel 608A and has been designated by reference numeral 610A, is configured as a Petzval face. The motor vehicle headlight 60 includes a light source 61A configured as an LED, by means of which, for implementing dipped-beam headlight, light is irradiated into or made to enter, respectively, the light entry face 601A of the light tunnel 608A.

The headlight lens part 600B comprises a light tunnel 608B, which has a light entry face 601B on one side and, on another side (on the bottom side of the headlight lens part 600B), passes over (forms transition) into a light passage or conductive section 609B of the headlight lens part 600B via a bend curved in two spatial dimensions, which light passage section 609B includes a light exit face 602B. The headlight lens part 600B is configured such that light, which enters the headlight lens 600B through the light entry face 601B, and, in the region of the bend, from the light tunnel 608B enters the passage section will exit from the light exit face 602B essentially in parallel to the optical axis 65B of the headlight lens part 600B. Herein, the light passage section 609B images the bend as a bright-dark-boundary. A portion of the surface of the light passage section 609B, which portion is facing the light tunnel 608B and has been designated by reference numeral 610B, is configured as a Petzval surface. The motor vehicle headlight 60 includes a light source 61B configured as an LED, by means of which, for implementing dipped-beam headlight, light is irradiated into or made to enter, respectively, the light entry face 601B of the light tunnel 608B.

The headlight lens part 600C comprises a light tunnel 608C, which has a light entry face 601C on one side and, on another side (on the bottom side of the headlight lens part 600C), passes over (forms transition) into a light passage section 609C of the headlight lens part 600C via a bend curved in two spatial dimensions, which light passage section 609C includes a light exit face 602C. The headlight lens part 600C is configured such that light, which enters the headlight lens 600C through the light entry face 601C, and, in the region of the bend, from the light tunnel 608C enters the passage section will exit from the light exit face 602C essentially in parallel to the optical axis 65C of the headlight lens part 600C. Herein, the light passage section 609C maps the bend as a bright-dark-boundary. A portion of the surface of the light passage section 609C, which portion is facing the light tunnel 608C and has been designated by reference numeral 610C, is configured as a Petzval surface. The motor vehicle headlight 60 includes a light source 61C configured as an LED, by means of which, for implementing dipped-beam headlight, light is irradiated into or made to enter, respectively, the light entry face 601C of the light tunnel 608C.

The optical axis 65A lies in a first plane, which is essentially horizontal. The optical axis 65B lies in a second essentially horizontal plane. The optical axis 65C lies in a third essentially horizontal plane. The first plane, the second plane, and the third plane extend essentially in parallel to each other. The optical axis 65A, moreover, lies in a first vertical plane. The optical axis 65B, moreover, lies in a second vertical plane. The optical axis 65C, moreover, lies in a third vertical plane. The first vertical plane is inclined by 0.5° with respect to the second vertical plane. The first vertical plane is inclined by 1° with respect to the third vertical plane. The second vertical plane is inclined by 0.5° with respect to the third vertical plane.

Figure 29:
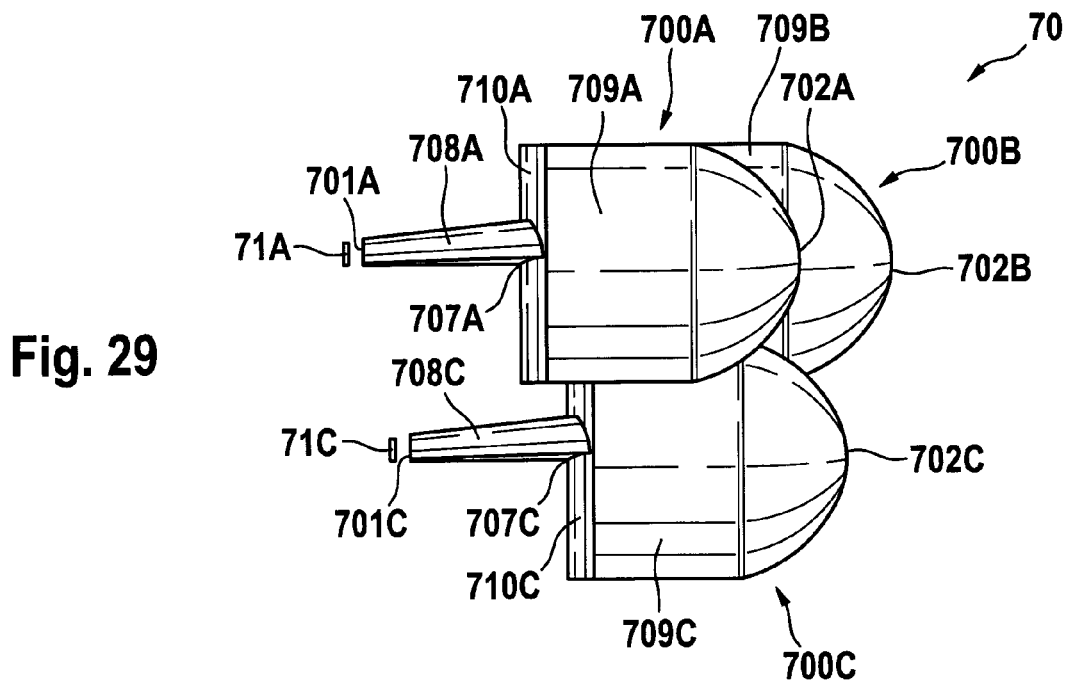
FIG. 29 shows a top view of a further example of embodiment of a motor vehicle headlight for use in the motor vehicle according to FIG. 1.

FIG. 29 shows, by way of a top view, a further motor vehicle headlight 70 alternatively to be used instead of motor vehicle headlight 10. The motor vehicle headlight 70 comprises a blank-molded monolithic body of inorganic glass, which body comprises a headlight lens part 700A, a headlight lens part 700B, and a headlight lens part 700C.

The headlight lens part 700A comprises a light tunnel 708A, which has a light entry face 701A on one side and, on another side, transits into a light passage section 709A of the headlight lens part 700A via a bend 707A curved in two spatial dimensions, which light passage section 709A includes a light exit face 702A. The headlight lens part 700A is configured such that light, which enters the headlight lens 700A through the light entry face 701A, and from the light tunnel 708A enters the passage section in the region of the bend 707A, will exit from the light exit face 702A essentially in parallel to the optical axis of the headlight lens part 700A. Herein, the light passage section 709A images the bend 707A as a bright-dark-boundary. A portion of the surface of the light passage section 709A, said surface facing the light tunnel 708A, and which portion has been designated by reference numeral 710A, is configured as a Petzval face. The motor vehicle headlight 70 includes a light source 71A configured as an LED, by means of which, for implementing dipped-beam headlight, light is irradiated into or made to enter, respectively, the light entry face 701A of the light tunnel 708A.

The headlight lens part 700B comprises a light tunnel (hidden in FIG. 29 by headlight lens part 700A), which has a light entry face on one side (hidden in FIG. 29 by headlight lens part 700A) and, on another side (on the bottom side of the headlight lens part 700B), forms transit into a light passage section 709B of the headlight lens part 700B via a bend curved in two spatial dimensions, which light passage section 709B includes a light exit face 702B. The headlight lens part 700B is configured such that light, which enters the headlight lens part 700B through the light entry face, and, in the region of the bend, from the light tunnel enters the passage section will exit from the light exit face 702B essentially in parallel to the optical axis of the headlight lens part 700B. Herein, the light passage section 709B images the bend as a bright-dark-boundary. A portion (hidden in FIG. 29 by headlight lens part 700A) of the surface of the light passage section 709B, which surface is facing the light tunnel, is configured as a Petzval surface. The motor vehicle headlight 70 includes a light source (hidden in FIG. 29 by headlight lens part 700A), configured as an LED, by means of which, for implementing dipped-beam headlight, light is irradiated into or made to enter, respectively, the light entry face of the light tunnel.

The headlight lens part 700C comprises a light tunnel 708C, which has a light entry face 701C on one side and, on another side (on the bottom side of the headlight lens part 700C), forms transition into a light passage section 709C of the headlight lens part 700C via a bend 707C curved in two spatial dimensions, which light passage section 709C includes a light exit face 702C. The headlight lens part 700C is configured such that light, which enters the headlight lens 700C through the light entry face 701C, and, in the region of the bend 707C, from the light tunnel 708C enters the passage section will exit from the light exit face 702C essentially in parallel to the optical axis of the headlight lens part 700C. Herein, the light passage section 709C images the bend 707C as a bright-dark-boundary. A portion of the surface of the light passage section 709C, said surface facing the light tunnel 708C, which portion has been designated by reference numeral 710C, is configured as a Petzval surface. The motor vehicle headlight 70 includes a light source 71C configured as an LED, by means of which, for implementing dipped-beam headlight, light is irradiated into or made to enter, respectively, the light entry face 701C of the light tunnel 708C.

Figure 30:
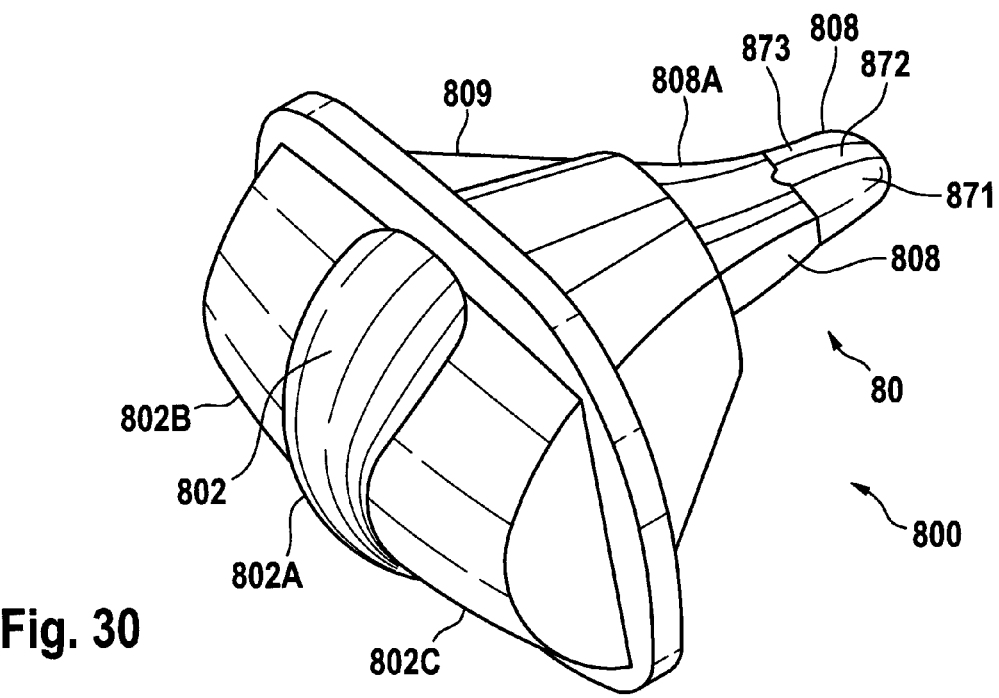
FIG. 30 shows a top view of a further example of embodiment of a motor vehicle headlight for use in the motor vehicle according to FIG. 1.
Figure 31:
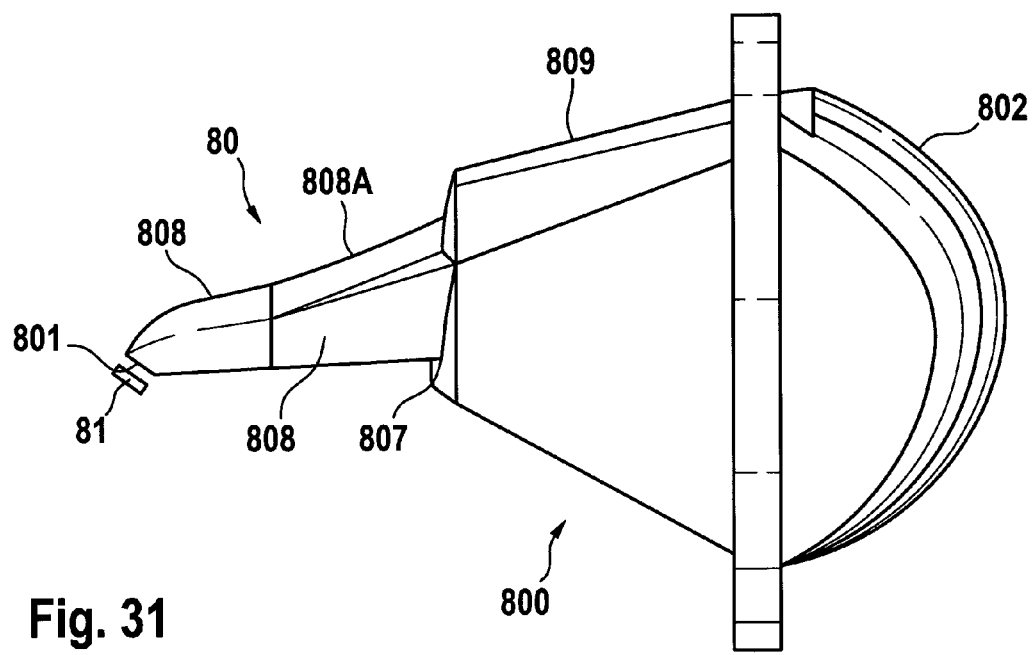
FIG. 31 shows the motor vehicle headlight lens according to FIG. 30 by way of a side view.
Figure 32:
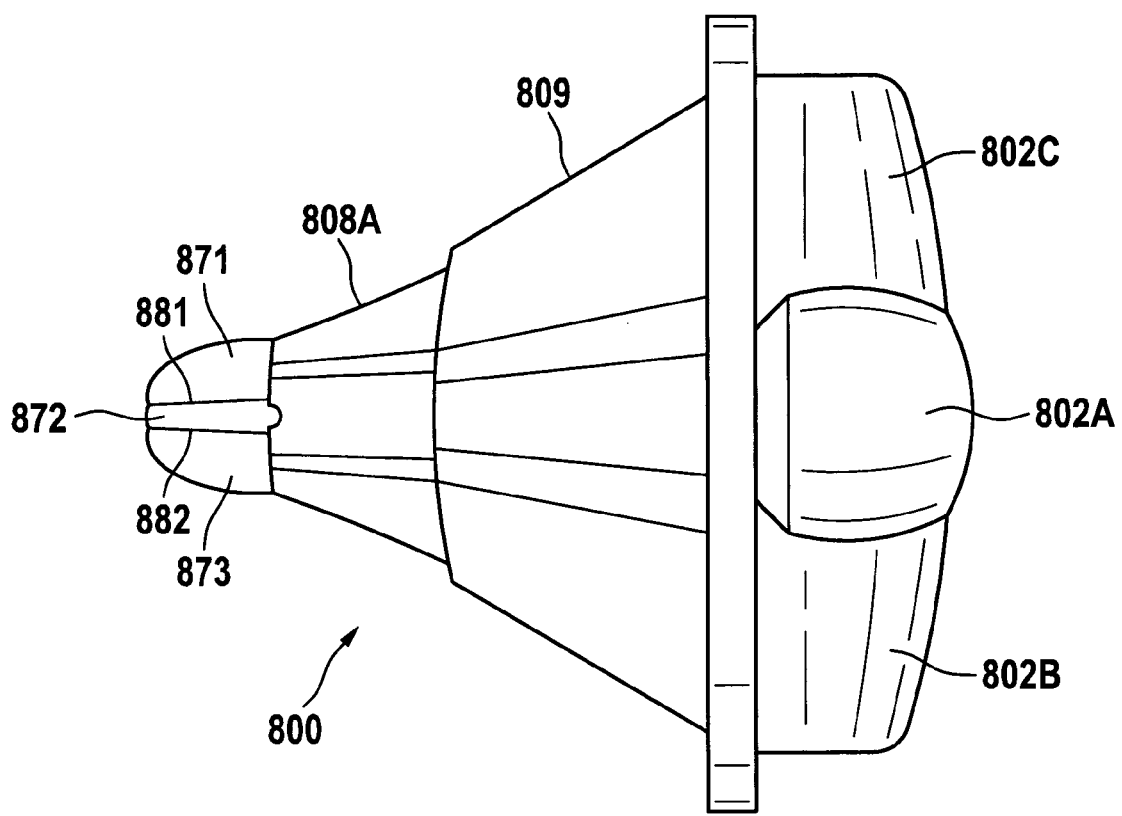
FIG. 32 shows the headlight lens according to FIG. 30 by way of a top view.
Figure 33:
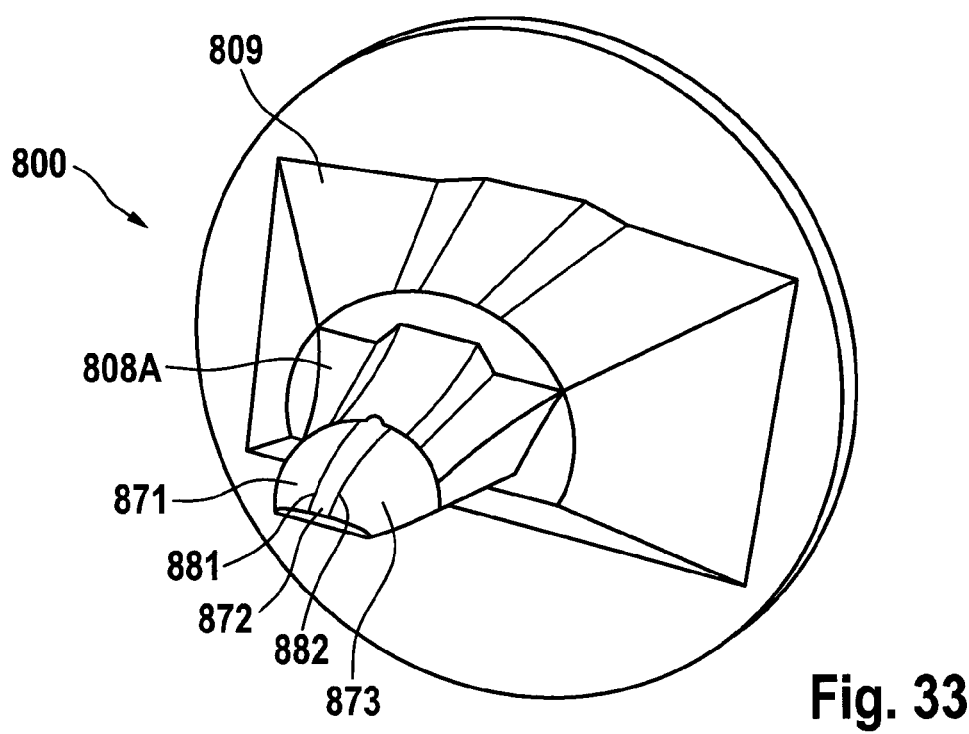
FIG. 33 shows the headlight lens according to FIG. 30 by way of a perspective representation from the rear.
Figure 34:
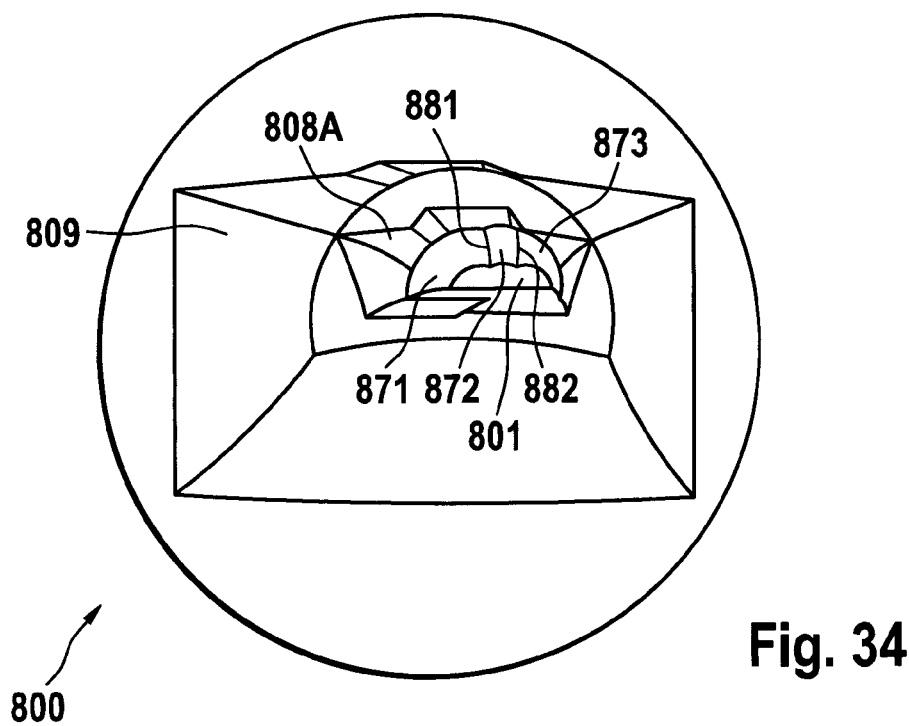
FIG. 34 shows the headlight lens according to FIG. 30 by way of a further perspective representation from the rear.
Figure 35:
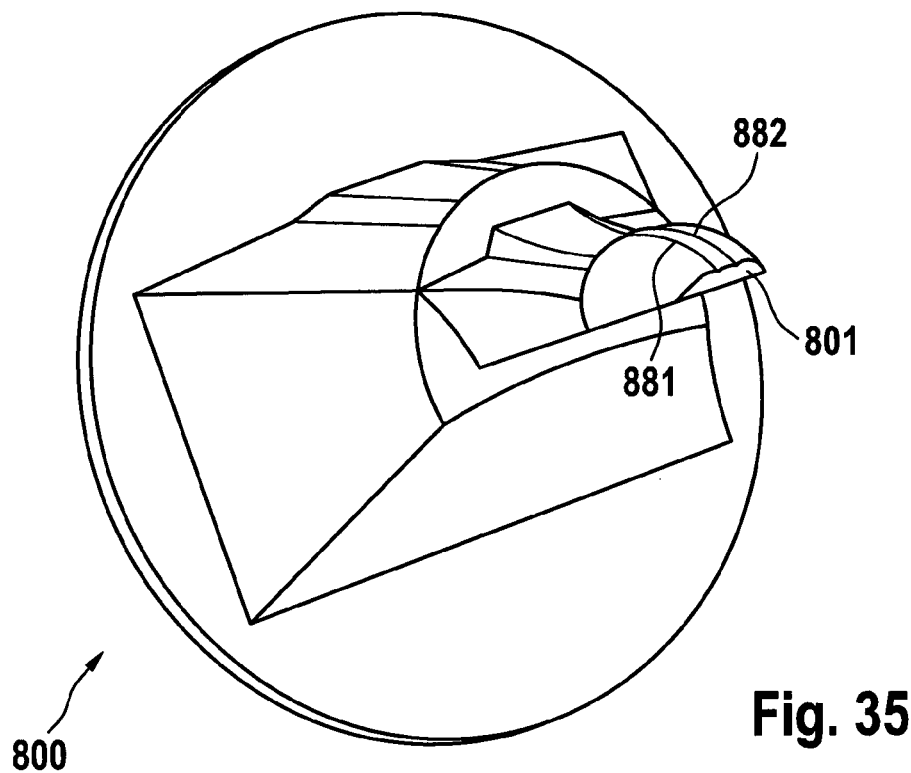
FIG. 35 shows the headlight lens according to FIG. 30 by way of a further perspective representation from the rear.

FIGS. 30 and 31 show a motor vehicle headlight 80, to be used alternatively with regard to motor vehicle headlight 10, however, without any housing, fittings and energy supply. Herein, FIG. 31 shows the motor vehicle headlight 80 by way of a side elevation and FIG. 30 shows the motor vehicle headlight 80 by way of an oblique top view. FIG. 32 shows the headlight lens 800 from above, by way of a top view, and FIG. 33, FIG. 34, and FIG. 35 show the headlight lens 800 by way of a perspective representation from the rear.

The motor vehicle headlight 80 comprises a light source 81 and a headlight lens 800. The motor vehicle headlight 80 may be complemented by further light sources, as have been disclosed in FIG. 2, FIG. 14, FIG. 18, FIG. 20, FIG. 21 and/or FIG. 22. The headlight lens 800 comprises a blank-molded monolithic body of inorganic glass, which body comprises a light tunnel 808, which has a light entry face 801 on one side and, on the other side, passes over into a light passage section 809 (of the blank-molded monolithic body) via a bend 807 curved in two spatial dimensions, which light passage section 809 includes a segmented light exit face 802, whose segments have been designated by reference numerals 802A, 802B, and 802C.

Figure 36:
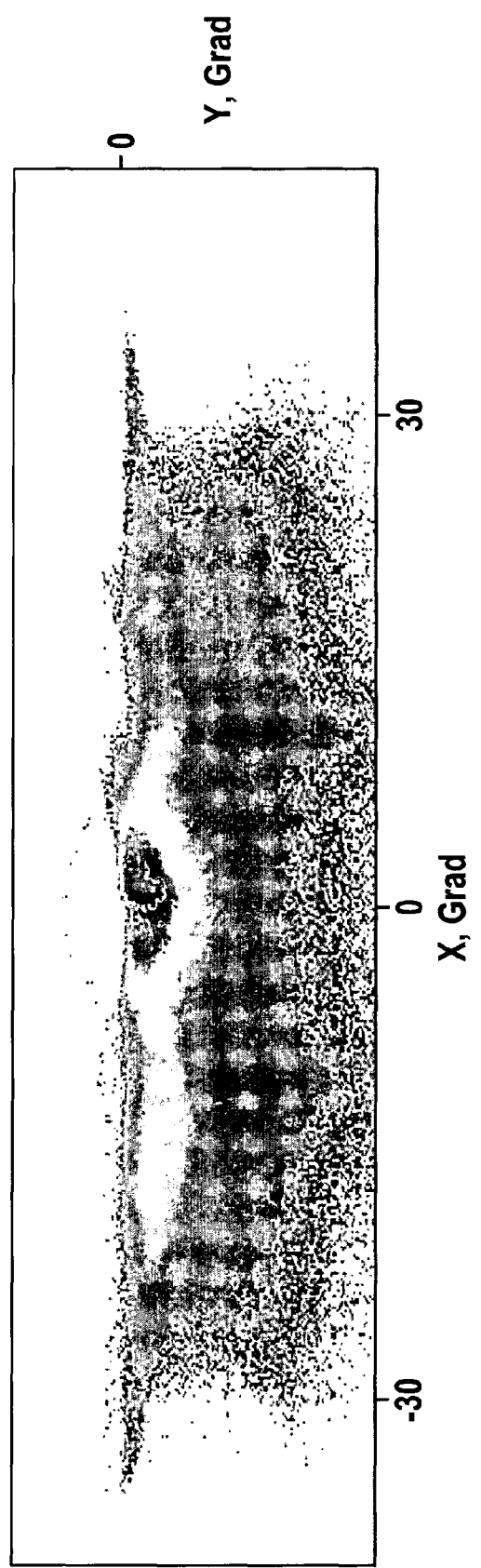
FIG. 36 shows a bright-dark-boundary generated by means of the motor vehicle headlight according to FIG. 30.

The headlight lens 800 is configured such that light, which enters the headlight lens 800 through the light entry face 801, and, in the region of the bend 807, from the light tunnel 808 enters the light passage section will exit from the light exit face 802 essentially in parallel to the optical axis of the headlight lens 800. Herein, the light passage section 809 images the bend 807 as a bright-dark-boundary, as has been represented in FIG. 36, wherein by means of the light source 81, for implementing dipped-beam headlight, light is irradiated into or made to enter, respectively, the light entry face 801 of the light tunnel 808.

The light tunnel 808 has a region of transition 808A, in which the surface restricting the light tunnel 808 upwardly in the direction towards the light passage section 809 rises and in which the surface restricting the light tunnel 808 downwardly extents horizontally or in parallel, respectively, regarding the optical axis of the headlight lens 800. In the rearward area of the light tunnel 808 the light tunnel 808 includes two indentations 881 and 882 on its upwardly restricting surface, which indentations extend essentially in the longitudinal direction of the light tunnel 808, or essentially in parallel to the optical axis of the light tunnel 808, or essentially in parallel to the optical axis of the light passage section 809, or essentially in parallel to the optical axis of the light exit face 802, respectively. In this portion, the light tunnel 808 comprises three segments 871, 872, and 873, which have an orientation in its longitudinal direction, which segments are configured or separated, respectively, by the indentations 881 and 882. The segments 871, 872, and 873 of the light tunnel 808 start at the light entry face 801 and extend up to the region of transition 808A. On their upper sides, the segments 871, 872, and 873 comprise a surface, which essentially corresponds to a part of the surface of an ellipsoid.

Figure 37:
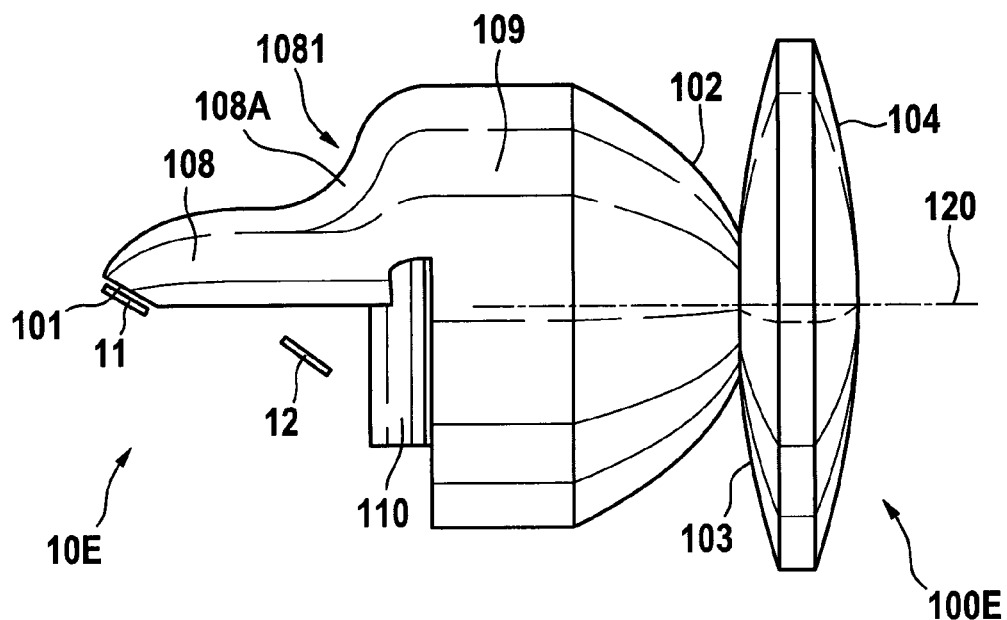
FIG. 37 shows a side view of a further example of embodiment of a motor vehicle headlight for use in the motor vehicle according to FIG. 1.

FIG. 37 shows a motor vehicle headlight 10E by way of a side elevation and to be used alternatively with regard to motor vehicle headlight 10, which motor vehicle headlight 10E comprises a headlight lens 100E modified with respect to headlight lens 100, wherein the light tunnel 108 includes a region of transition 108A starting as from line 111 (cf. FIG. 5), in which region the surface restricting the light tunnel 108 upwardly rises in the direction towards the light passage section 109. Herein, the surface restricting the light tunnel 108 upwardly includes, within the region of transition 108A, a concavely curved area having a radius of curvature of at least 20 mm as well as a point of inflection (a turning or reversal point) 1081. The region of transition 108A is configured such that the surface restricting the light tunnel 108 upwardly transits without any bend or without any step into the surface restricting the light passage section 109 upwardly. The motor vehicle headlight 10E may be completed (complemented) by further light sources as have been disclosed in FIG. 14, FIG. 18, FIG. 20, FIG. 21, and/or FIG. 22.

Figure 38:
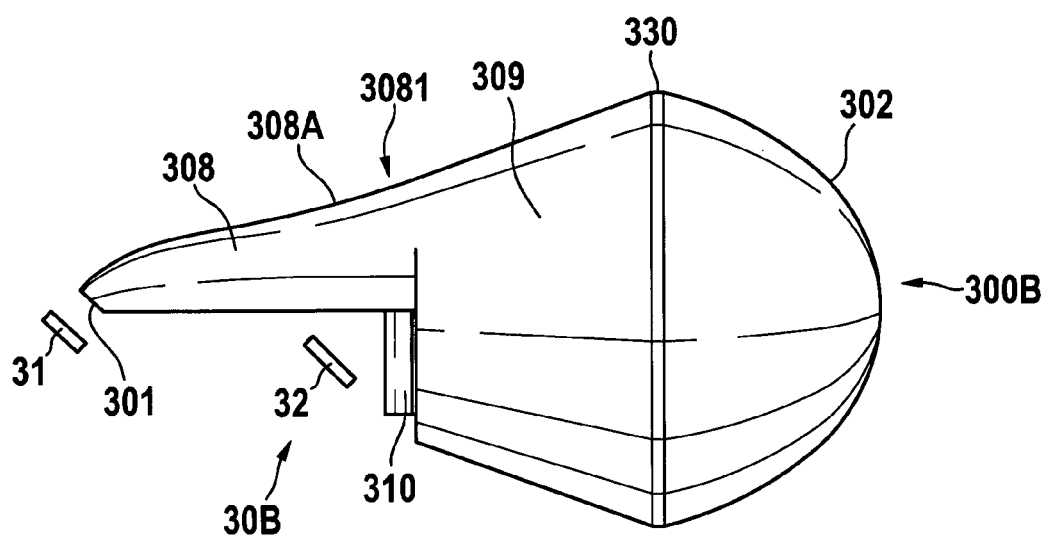
FIG. 38 shows a side view of a further example of embodiment of a motor vehicle headlight for use in the motor vehicle according to FIG. 1.

FIG. 38 shows a motor vehicle headlight 30B by way of a side elevation and to be used alternatively with regard to motor vehicle headlight 10, which motor vehicle headlight 30B comprises a headlight lens 300E modified with regard to headlight lens 300, wherein the light tunnel 308 includes a region of transition 308A in which the surface restricting the light tunnel 308 upwardly rises in the direction towards the light passage section 309. Herein, the surface restricting the light tunnel 308 upwardly includes, within the region of transition 308, a concavely curved area having a radius of curvature of at least 20 mm as well as a (turning or reversal) point of inflection 3081. The region of transition 308A is configured such that the surface restricting the light tunnel 308 upwardly transits into the surface, which restricts the light passage section 309 upwardly, without any bend or without any step. The motor vehicle headlight 30B may be completed (complemented) by further light sources as have been disclosed in FIG. 14, FIG. 18, FIG. 20, FIG. 21, and/or FIG. 22.

The headlight lens 500A, the headlight lens 500B, the headlight lens part 600A, the headlight lens part 600B, the headlight lens part 600C, the headlight lens part 700A, the headlight lens part 700B, and/or the headlight lens part 700C may be configured in analogy with headlight lenses 100, 100E, 300, 300B, 400, and 800, respectively.

Statements or terms regarding the orientation such as "upward(ly)", "rising" or "horizontal(ly)" relate to normal (designated or intended) operation of a (motor) vehicle headlight. Such statements particularly refer to a (motor) vehicle headlight installed in a horizontally positioned motor vehicle. The elements, distances and angles in the figures have been represented in consideration of simplicity and clearness and not necessarily to scale. For example, the orders of magnitude of some of the elements, distances and angles have been exaggerated with respect to other elements, distances and angles in order to enhance comprehension of the examples of embodiments of the present invention. Also, in order to improve comprehension of the examples of embodiment of the present invention, the motor vehicle headlights have been represented without any housings, fittings, and energy supply.

The invention claimed is:

1. A headlight lens for a vehicle headlight, the headlight lens comprising a body from transparent material, the body comprising:
 a light passage section, the light passage section including at least one optically operative light exit face, wherein the light exit face comprises at least two segments, which are separated from each other by means of one of the group consisting of an indentation, a notch, and a discontinuity; and
 a light tunnel, the light tunnel comprising at least one light entry face, and the light tunnel, via a bend, forming transition into the light passage section;
 the light passage section being configured for imaging the bend as a bright-dark-boundary by means of light irradiated into the light entry face.

2. Headlight lens as claimed in claim 1, wherein a top surface of the light tunnel includes an indentation extending essentially in parallel to at least one of the group consisting of an optical axis of the light tunnel, an optical axis of the light passage section, and an optical axis of the light exit face, wherein the indentation separates two segments of the light tunnel.

3. Headlight lens as claimed in claim 2, wherein the segments of the light tunnel emanate from the light entry face.

4. Headlight lens as claimed in claim 3, wherein the light entry face is inclined with respect to the optical axis of the light passage section by an angle of between 5° and 7°.

5. Headlight lens as claimed in claim 4, wherein a segment of the light tunnel comprises an area on its surface, which area essentially corresponds to a part of the surface of an ellipsoid.

6. Headlight lens as claimed in claim 2, wherein a segment of the light tunnel comprises an area on its surface, which area essentially corresponds to a part of the surface of an ellipsoid.

7. Headlight lens as claimed in claim 1, wherein an upper surface of the light tunnel includes an indentation, wherein the indentation separates two segments of the light tunnel.

8. Headlight lens as claimed in claim 7 wherein a segment of the light tunnel comprises an area on its surface, which area essentially corresponds to a part of the surface of an ellipsoid.

9. Headlight lens as claimed in claim 1, wherein light the exit face includes a light dispersing structure.

10. A vehicle headlight having a headlight lens and at least a first light source, the headlight lens comprising a monolithic body from transparent material, the body comprising:
 a light passage section, the light passage section including at least one optically operative light exit face, wherein the light exit face comprises at least two segments, which are separated from each other by means of an indentation; and
 a light tunnel, the light tunnel comprising at least one light entry face, and the light tunnel, via a bend, forming transition into the light passage section;
 the light passage section being configured for imaging the bend as a bright-dark-boundary by means of light irradiated into the light entry face by means of the first light source.

11. Headlight as claimed in claim 10, wherein the light exit face comprises at least three segments, which are separated from each other by means of an indentation.

12. Headlight as claimed in claim 10, wherein a surface restricting the light tunnel at the top includes an indentation separating two segments of the light tunnel, which segments emanate from the light entry face.

13. Headlight as claimed in claim 12, wherein a segment of the light tunnel comprises an area on its surface, which area essentially corresponds to a part of the surface of an ellipsoid.

14. Headlight as claimed in claim 12, wherein the light entry face is inclined with respect to the optical axis of the light passage section by an angle of between 5° and 7°.

15. Headlight as claimed in claim 12, wherein each segment of the light tunnel comprises an area on its surface, which area essentially corresponds to a part of the surface of an ellipsoid.

16. Headlight as claimed in claim 10, the bend being a curved transition having a radius of curvature of no more than 5 mm.

17. Headlight as claimed in claim 10, wherein the vehicle headlight comprises at least one second light source, which is spatially separated from the first light source, the second light source being configured for irradiating light into the light tunnel and into the light passage section without passing the light tunnel.

18. Headlight as claimed in claim 17, the bend being a curved transition having a radius of curvature is no more than 0.25 mm.

19. Headlight as claimed in claim 17, the second light source being arranged for irradiating light above and below the bright-dark-boundary.

20. Headlight lens for a vehicle headlight, the headlight lens comprising a body from transparent material, the body comprising:
 a light passage section, the light passage section including at least one optically operative light exit face; and
 a light tunnel, the light tunnel comprising at least one light entry face, and the light tunnel, via a bend, forming transition into the light passage section, wherein a surface restricting the light tunnel at the top includes an indentation separating two segments of the light tunnel;
 the light passage section being configured for imaging the bend as a bright-dark-boundary by means of light irradiated into the light entry face.

21. Headlight lens as claimed in claim 20, wherein the segments of the light tunnel emanate from the light entry face.

22. Headlight lens as claimed in claim 21, wherein the light entry face is inclined with respect to an optical axis of the light passage section by an angle of between 5° and 7°.

23. Headlight lens as claimed in claim 22, wherein a segment of the light tunnel comprises an area on its surface, which area essentially corresponds to a part of the surface of an ellipsoid.

24. Headlight lens as claimed in claim 23, wherein the bend being a curved transition having a radius of curvature of no less than 50 nm and no more than 0.25 mm.

25. Headlight lens as claimed in claim 20, wherein the bend being a curved transition having a radius of curvature of no more than 5 mm.

26. Headlight lens as claimed in claim 20, the indentation extending essentially in parallel to at least one of the group consisting of an optical axis of the light tunnel, an optical axis of the light passage section, and an optical axis of the light exit face.

* * * * *